(12) United States Patent
Strohfus et al.

(10) Patent No.: US 6,655,892 B2
(45) Date of Patent: Dec. 2, 2003

(54) BEVERAGE DISTRIBUTION SYSTEM AND METHOD OF ITS MANUFACTURE AND OPERATION

(75) Inventors: Norman C. Strohfus, Eagan, MN (US); Robert W. Grace, Twinsburg, OH (US); David J. Glancy, Twinsburg, OH (US)

(73) Assignee: Coca-Cola Enterprises, Inc., Atlanta, GA (US)

( * ) Notice: Subject to any disclaimer, the term of this patent is extended or adjusted under 35 U.S.C. 154(b) by 0 days.

(21) Appl. No.: 09/910,235

(22) Filed: Jul. 20, 2001

(65) Prior Publication Data

US 2002/0101049 A1 Aug. 1, 2002

Related U.S. Application Data

(63) Continuation of application No. PCT/US00/01400, filed on Jan. 20, 2000.

(51) Int. Cl.⁷ ................................ B60P 1/00; B60P 3/00
(52) U.S. Cl. ...................... 414/334; 414/340; 414/345; 414/373; 414/498; 414/501; 414/490; 414/444
(58) Field of Search ................................ 414/334, 340, 414/345, 373, 498, 499, 501, 490, 444

(56) References Cited

U.S. PATENT DOCUMENTS

| 2,950,126 | A | * | 8/1960 | Armentrout | 280/179 |
| 3,749,268 | A | * | 7/1973 | Macomber et al. | 414/499 |
| 4,948,154 | A | * | 8/1990 | Guggenheim | 280/79.3 |
| 5,853,181 | A | * | 12/1998 | Booras | 280/47.35 |

* cited by examiner

Primary Examiner—Steven A. Bratlie
(74) Attorney, Agent, or Firm—Miller & Martin LLP

(57) ABSTRACT

A series of transport carts (21) are positioned in side by side relation in fore and aft extending spaced apart rows disposed along a delivery van (22) to leave an aisle (58) between them. The carts have wheel supported frames (28) with bottom supports (131) for the products disposed at a level above the floor of the van and open fronts from which the carts can be unloaded. The carts have rear posts (58) which are disengageably locked in track sections (66, 67) provided in longitudinally spaced relation along the van side walls. Pallets (30) with discs (34) projecting downwardly from the floors of the pallets support the product stacks on the cart bottom supports. A hand truck with a bifurcated nose plate defining disc receiving arms engages under each pallet to enable removal of a pallet and product stack (31) from the cart.

16 Claims, 27 Drawing Sheets

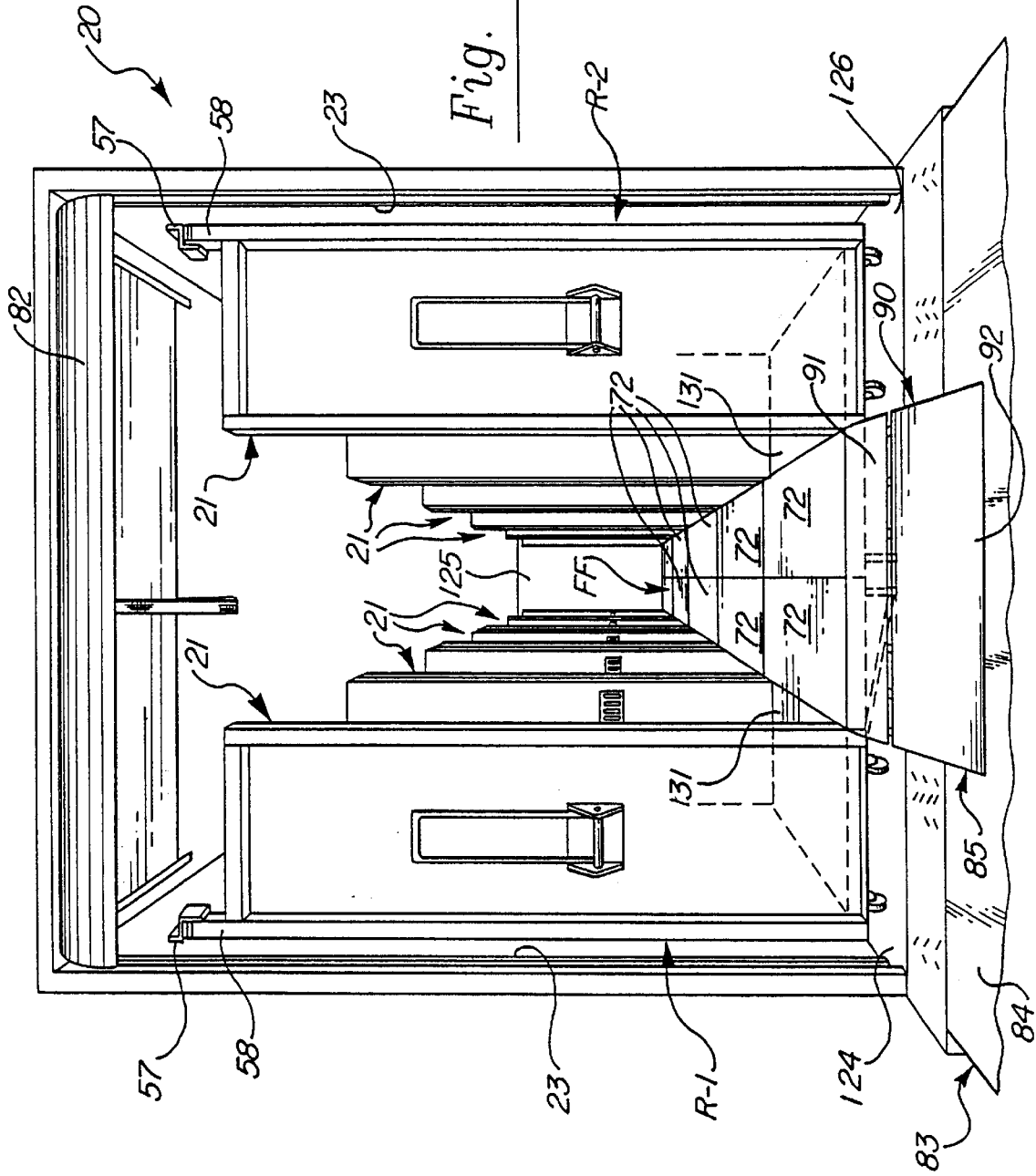

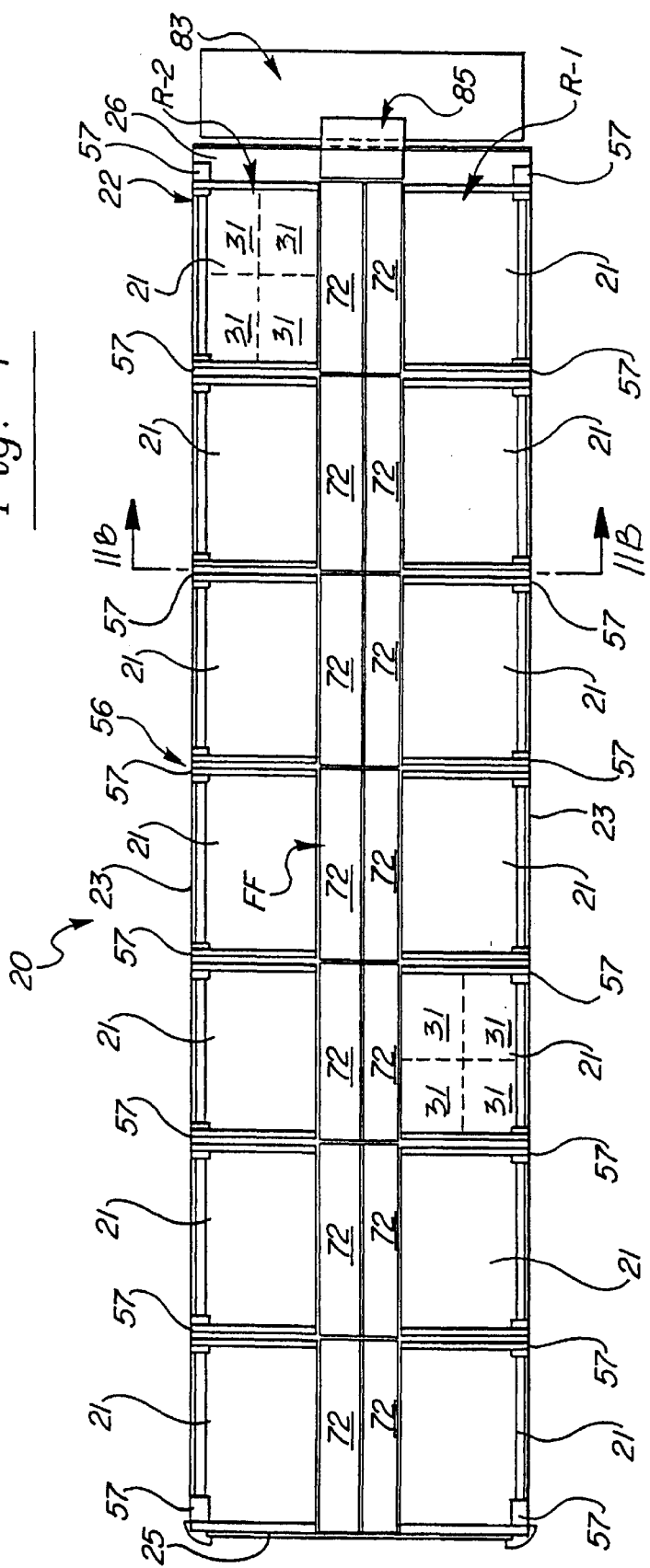

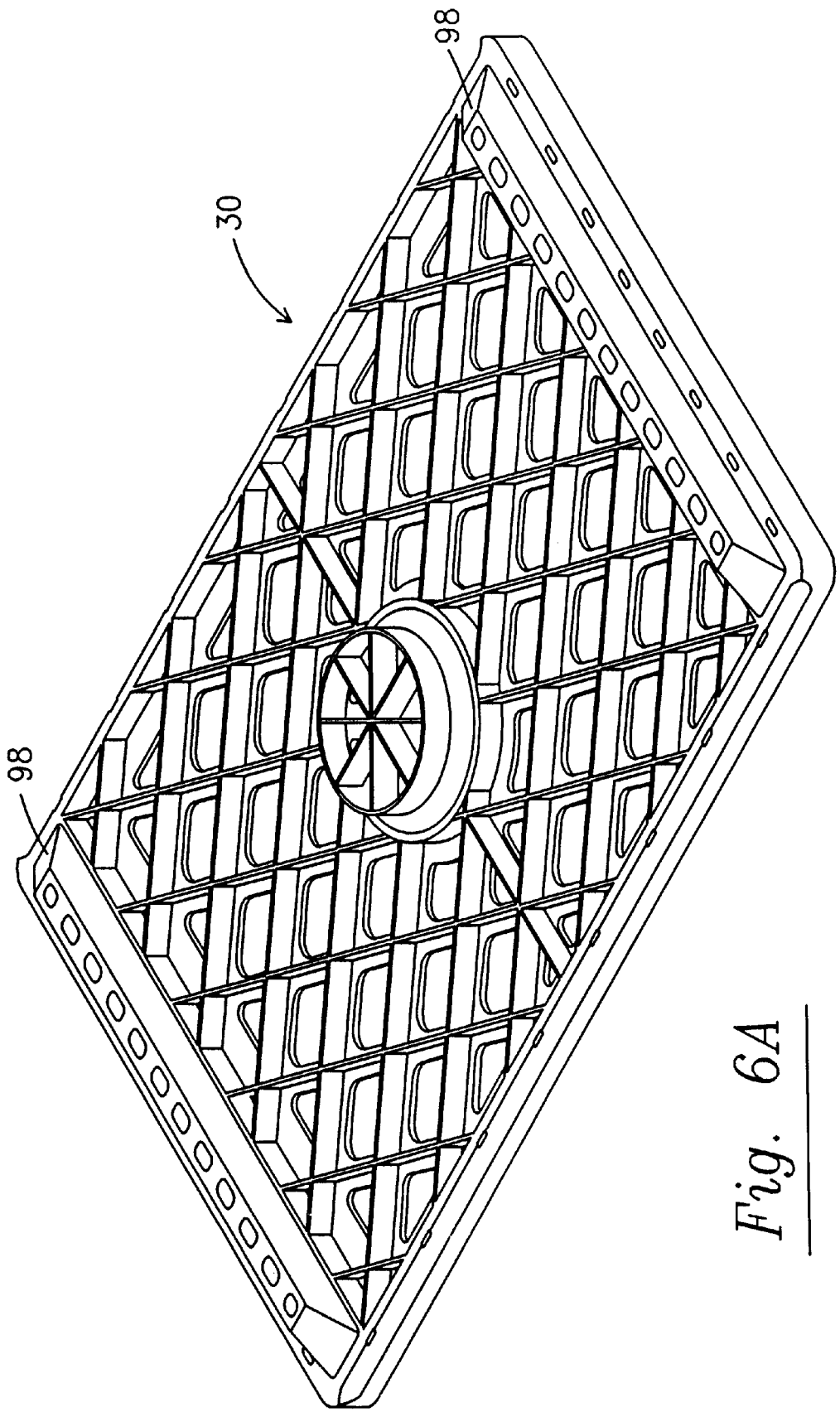

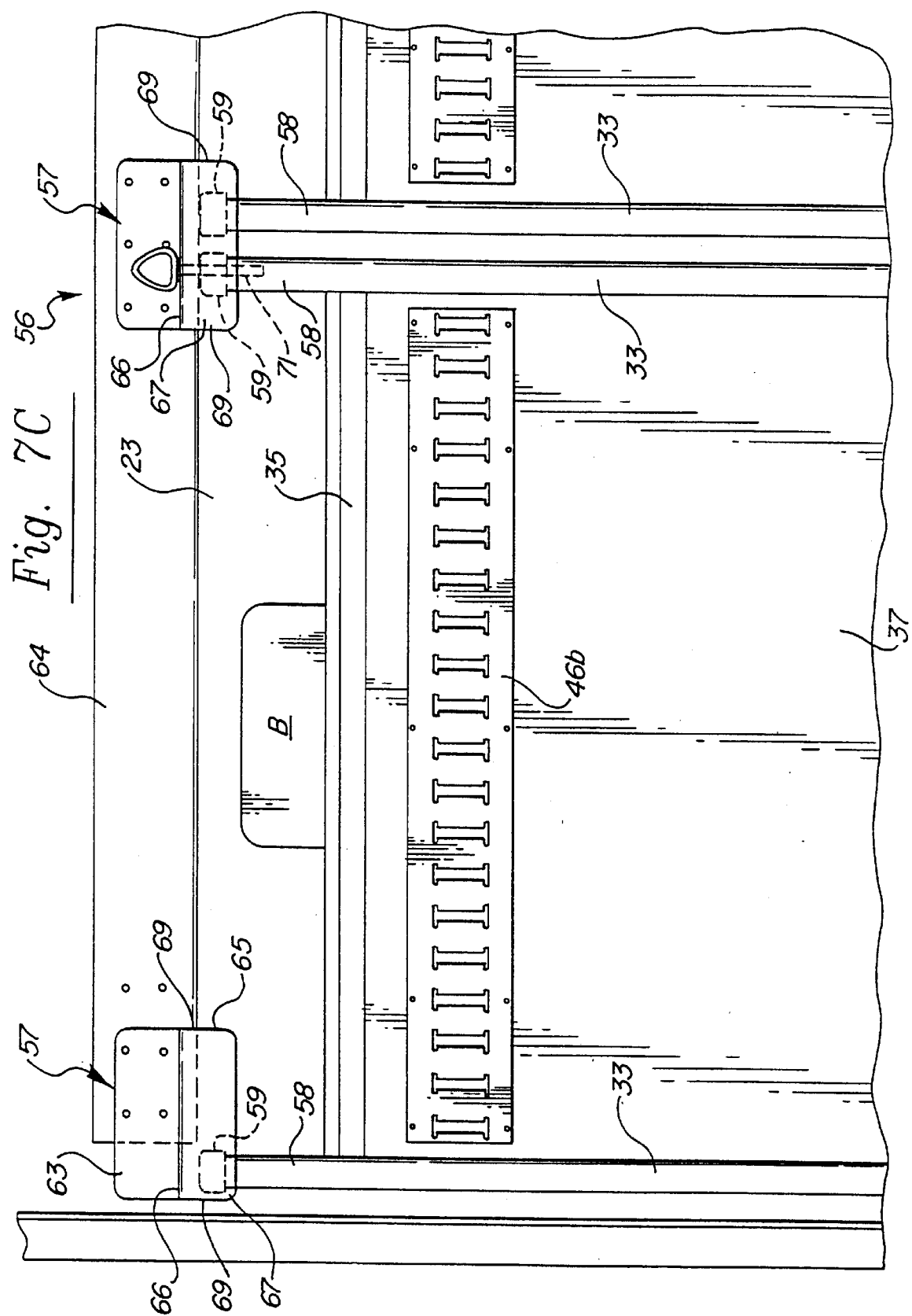

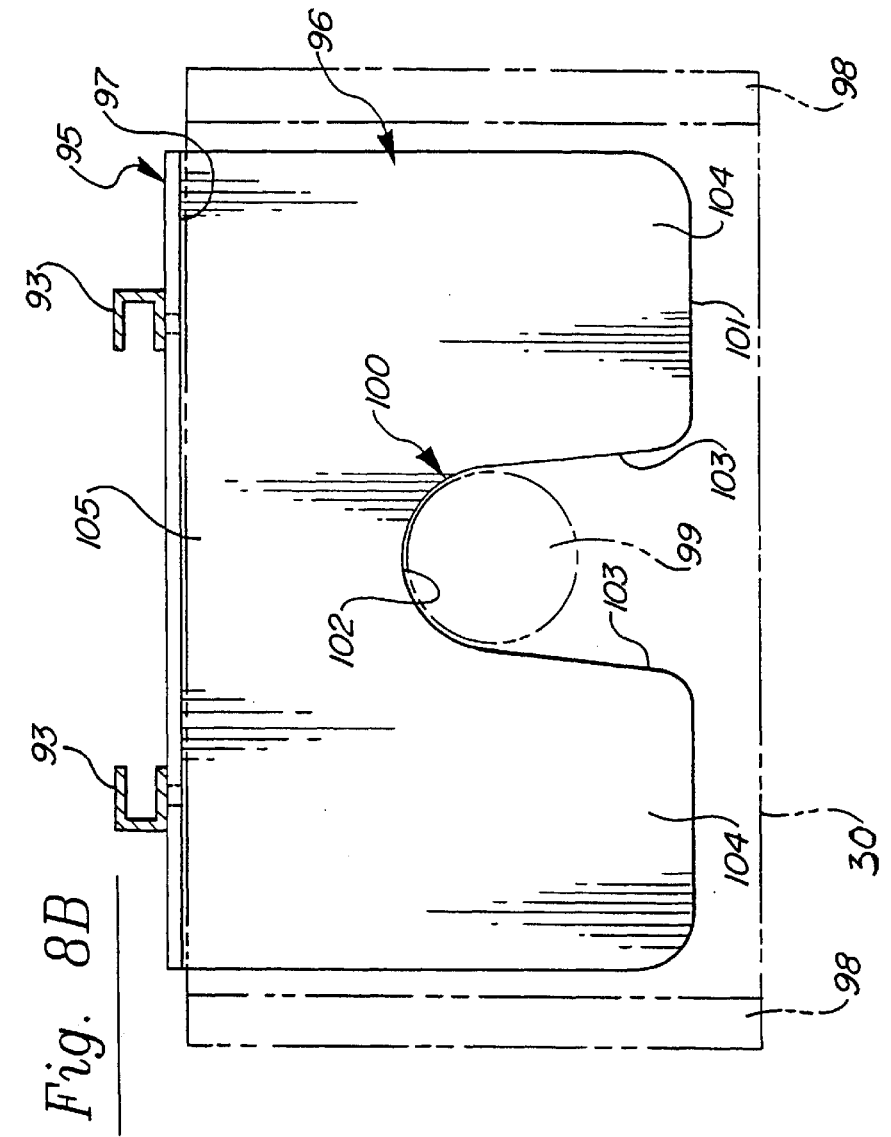
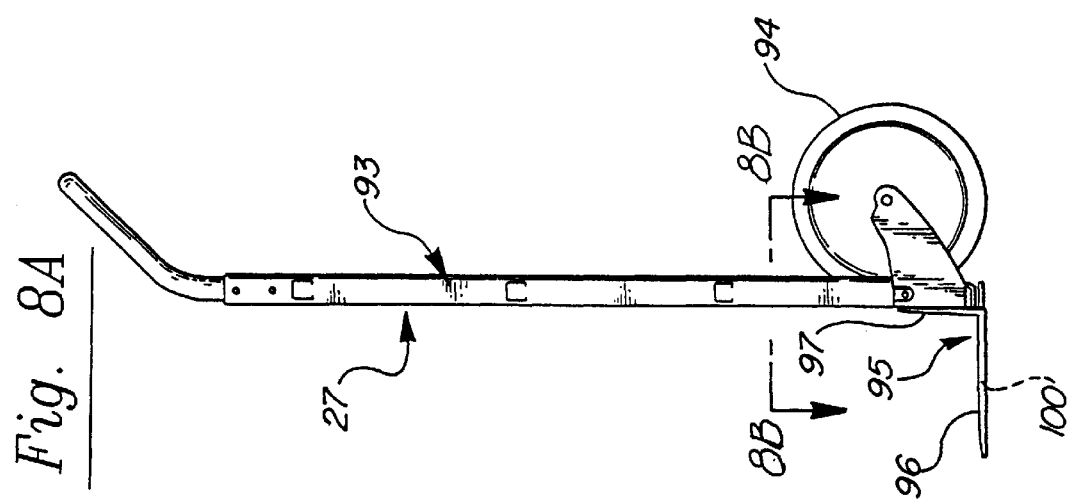

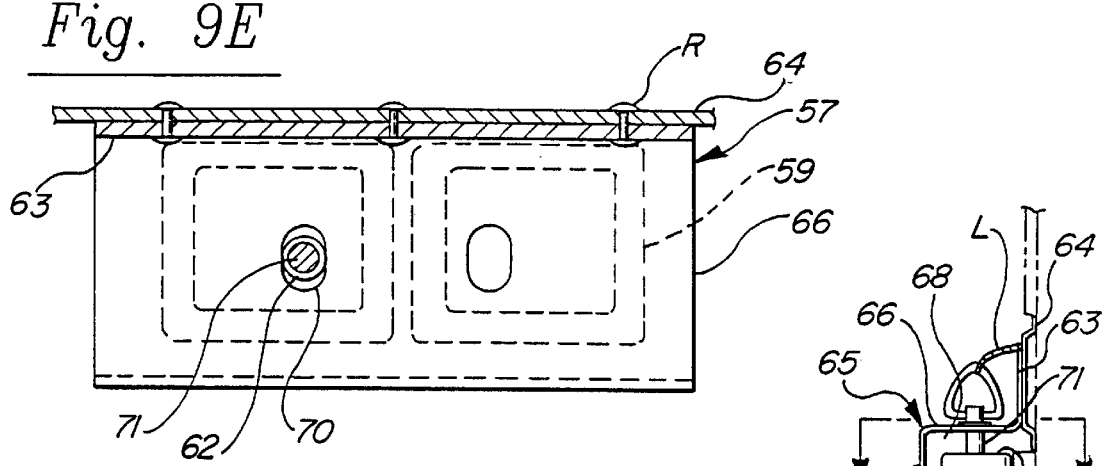
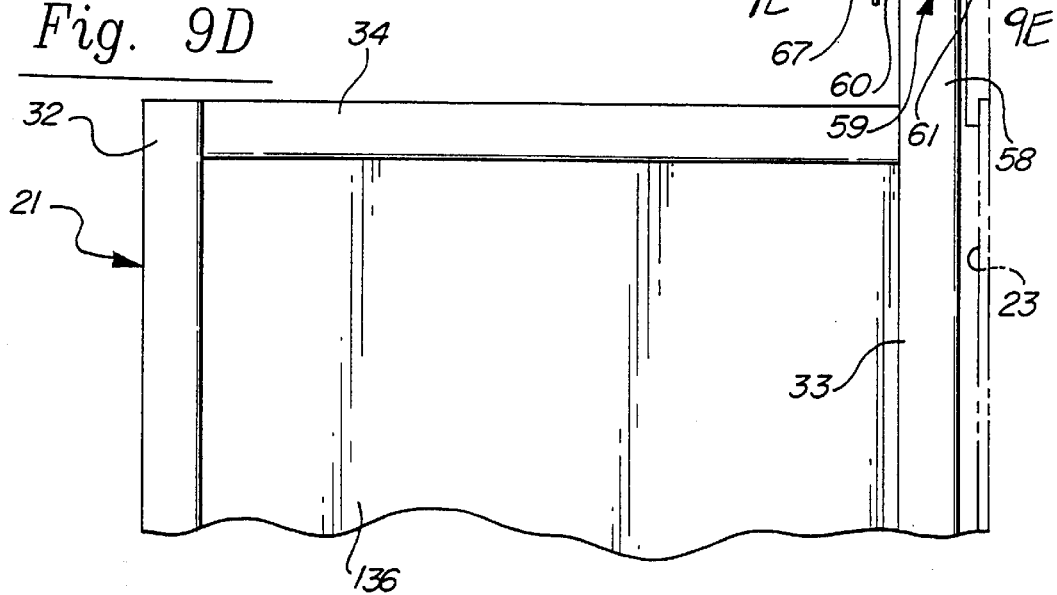
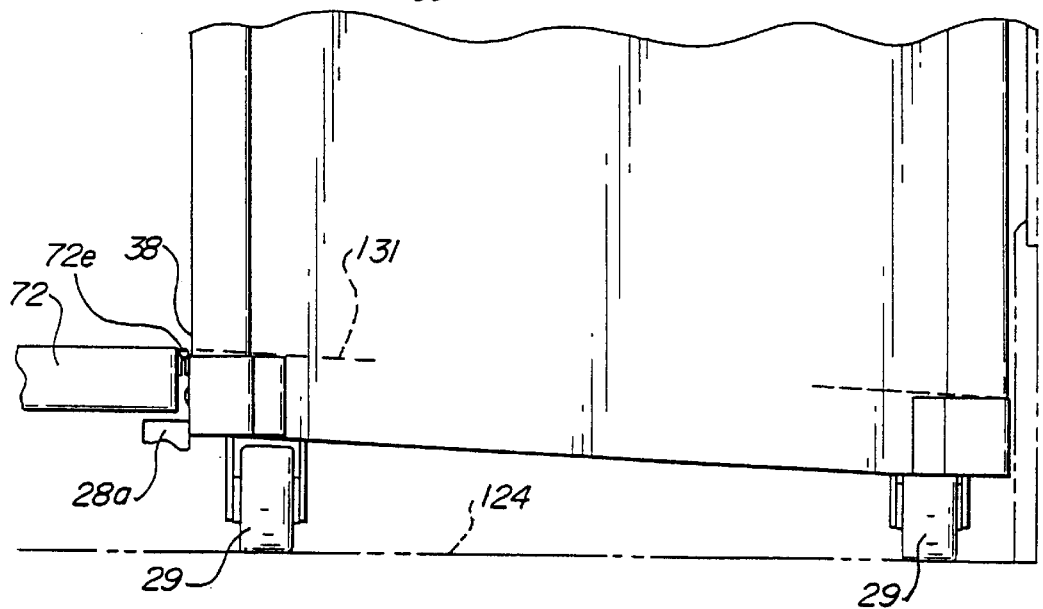

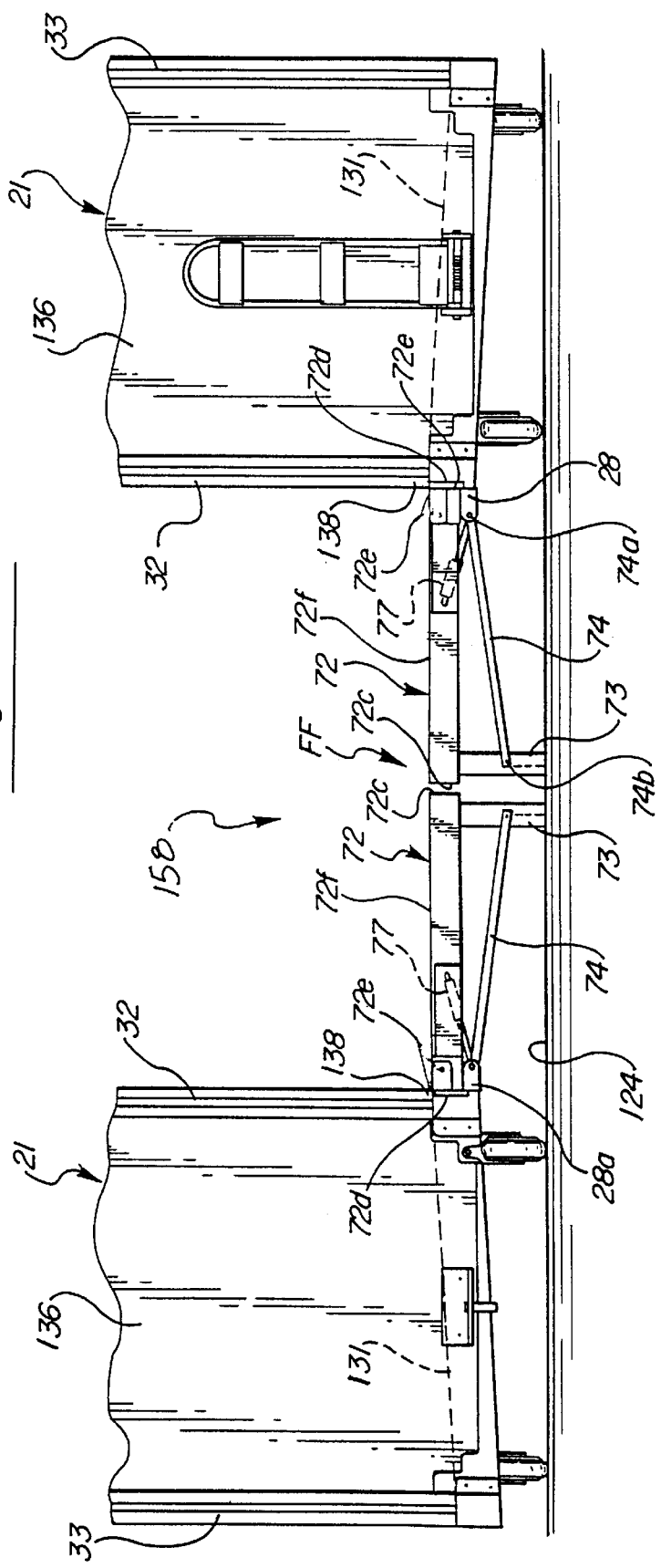

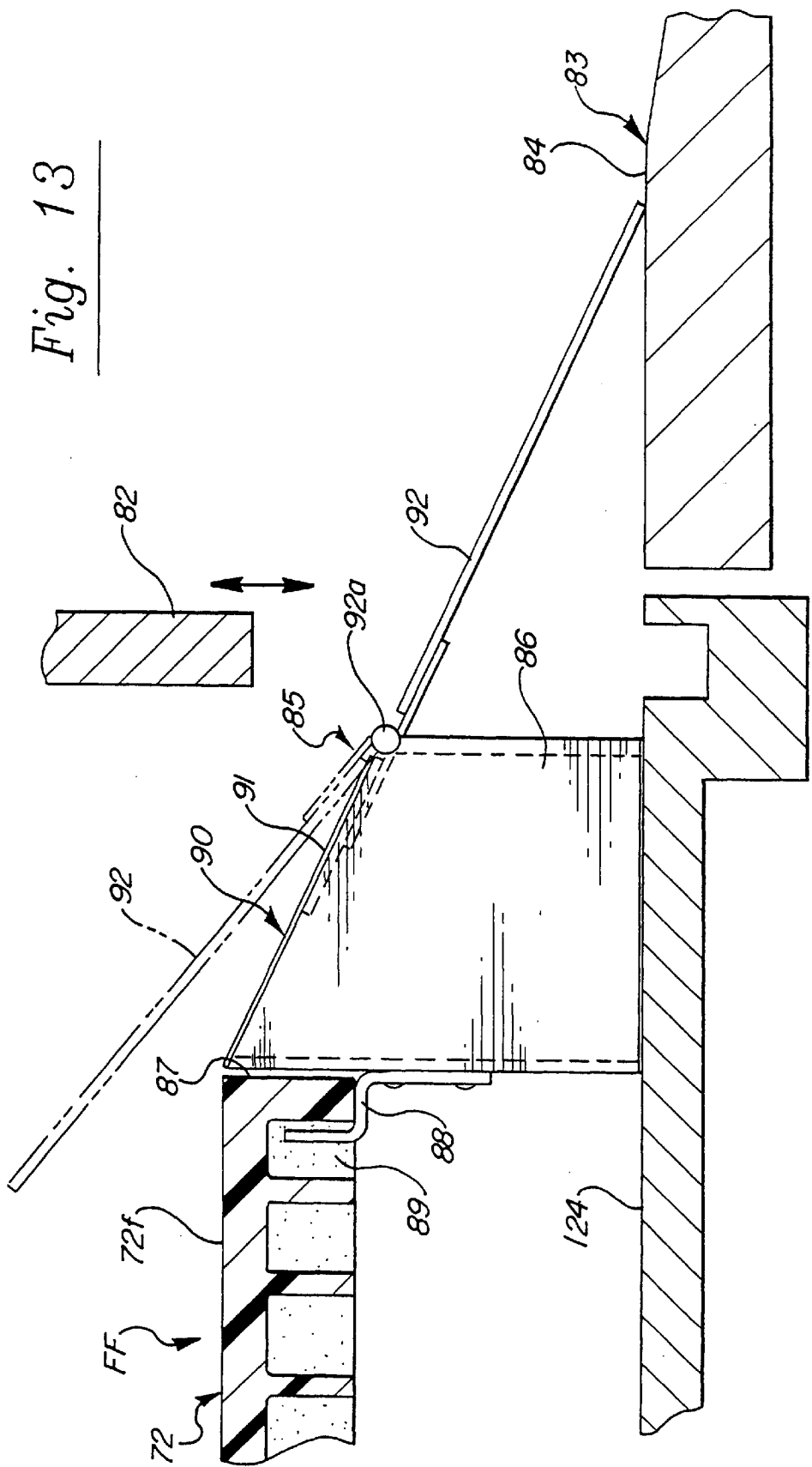

BEVERAGE DISTRIBUTION SYSTEM AND METHOD OF ITS MANUFACTURE AND OPERATION

This application is a continuation of PCT/US00/01400 filed Jan. 20, 2000.

This invention is entitled to the priority of U.S. provisional application Serial No. 60/116,473, filed Jan. 20, 1999, PCT patent application entitled TRANSPORT CART SYSTEM AND METHOD OF ITS MANUFACTURE AND OPERATION, filed Jan. 5, 2000, U.S. provisional application Serial No. 60/094,439, filed Jul. 28, 1998, now abandoned, and PCT application No. PCT/US99/10844, filed May 20, 1999, all of which are incorporated herein by reference, and relates generally to the methods and apparatus to facilitate the distribution of beverages, and more particularly to the manufacture and handling of transportation devices and methods for carrying products such as stacked cases of beverage containers for transport in a delivery vehicle. Typically, the vehicle moves the carts from a manufacturing facility or distribution center to a retailer.

BACKGROUND OF THE INVENTION

The current method of beverage distribution essentially considers the beverage truck driver a salesman. The driver's truck is loaded with a selection of beverages, and the driver calls on accounts on a route. At each account, the driver determines what beverages are required or desired by the account, then the driver locates the beverages in his truck, unloads the beverages and delivers them to the account. This process would be relatively easy if only a single beverage were involved. For instance, if the driver only distributed a single brand of cola, his truck would be completely loaded with that one beverage, and it could be easily unloaded at each account, and accounts could be serviced until the truck was completely empty.

Accordingly, it is desirable to create a new beverage delivery system which takes full advantage of information available when a truck is loaded to improve delivery service. The truck can be loaded to specifically meet the orders of each account on a route and to minimize the time needed to select and unload the beverages ordered by each individual account.

Side loading route trucks are typically used for commercial deliveries to sales outlets that receive merchandise through a door at ground level, as opposed to a loading dock. Most bulk deliveries for large accounts are made utilizing tractor trailer units to deliver to a loading dock. The trailer has a rear door that open into a large interior area with a flat floor. The typical chain store wants such bulk delivery trucks in and out of their loading docks within a very narrow time span each morning. Furthermore, chain stores usually prefer to be the first delivery on a route. In order to satisfy these customer requirements, bottlers employ a large number of bulk rigs. Some of these bulk rigs may be left idle for much of the day following morning deliveries. The number of bulk rigs that are needed can be reduced by attempting to negotiate appropriate delivery times with chain stores, however this has not been a totally satisfactory solution. In an effort to overcome this problem, U.S. Pat. No. 4,659,132 describes a side load trailer which can be configured to carry bulk pallets. While this invention addresses the need to more efficiently utilize trailers, it does not provide for more efficient delivery of beverages to route accounts.

A principal object of the present invention is to provide a more efficient system for getting products from the point of manufacture or distribution to the retailer.

It is also an object of the present invention to facilitate the loading of beverage trucks with beverages sorted by account order rather than SKU.

It is a further object of the invention to provide improved truck designs to facilitate both the loading and unloading of trucks with beverages sorted by account order.

It is yet another object of the invention to provide truck designs that will permit loading combinations of bulk and route beverage orders.

It is another object of the invention to provide a mobile beverage cart to facilitate the loading and unloading of beverage trucks with beverages sorted by account order.

It is yet a further object of the inventor to provide a novel pallet for use with a matching hand truck to facilitate the loading and unloading of beverage trucks with beverages sorted by account order.

SUMMARY OF THE INVENTION

A transport and delivery system constructed and operated according to the invention utilizes a series of preferably wheeled carts having upstanding back and side retention members or walls, which have been loaded at a manufacturing and/or distribution facility with stacks of containers advantageously presorted by brand and quantity according to the orders to be filled. These stacks are preferably built on mini-pallets such that a given cart may be loaded with one or several (four for example) of such mini-stacks.

The location of each prefilled order may be recorded as to which cart or carts are involved and as to the particular location of the stack or stacks within the carts. For example, a given order might be contained in cart No. 4, stacks 1–3. Once filled with product the carts are wheeled into an elongate delivery van or trailer of conventional manufacture and positioned so that the carts line the opposite walls of the trailer in two laterally spaced rows leaving a center aisle down the middle of the trailer wide enough to access the carts with a two-wheeled hand truck.

The cart floors are preferably supported above the level of the floor of the trailer on wheels or other appropriate motive supports. A false floor may be provided along the aisle to elevate the walkway to the level of the cart floors, so that an operator, using a two-wheeled hand truck, is able to access the mini-stacks in the carts with the hand truck. The false floor is provided by opposing sets of retractable deck sections carried off the forward edge of each cart which can be moved into the aisle to form an elevated sectionalized walkway.

The deck sections have automatically folded and restored front support leg structures. The deck sections are disclosed as including at least one gas spring operative to assist an operator to move the deck sections between the extended and stowed positions. The springs also exert a constant downward biasing force on the deck sections which serves to maintain them in position during transport over any rough terrain and further act to retain the deck sections in the stowed and use positions.

The trailer van, which preferably opens at its back end, is fitted with a powered lift gate that can be raised to the level of the floor of the trailer. The false floor is thus supported above the level of the lift gate. According to a further aspect of the invention, a ramp is positioned between the false floor and lift gate to provide a transition from the elevated false floor to the lift gate. The ramp preferably includes a foldable section that, in use, extends out of the trailer and onto the lift gate and, when stowed, is hinged inwardly of the trailer van to accommodate closing of the back door(s) of the trailer.

According to the operation of the system, the carts, once loaded into and locked in the trailer, are transported along with the hand truck from the manufacturing and/or distribution center to the various retail delivery sites. Since the orders for each site may be prebuilt according to the type and quantity of the various brands of beverages or other products, the operator need only locate the order, remove the ministack(s) of containers from the cart(s) with the hand truck, and wheel the load(s) along the elevated false floor formed by the deck sections, down the ramp and onto the elevated lift gate, which is then lowered to the ground to enable the operator to wheel the order into the facility of the business receiving them. When the deliveries are completed, the emptied trailer may then be returned to the distribution center where the deck sections are returned to their stowed positions, and the empty carts are unlocked and removed from the trailer. The trailer can then be loaded with a waiting set of carts preloaded with additional orders, and the off-loaded emptied carts can be recycled to handle future orders.

Considerable labor and time is saved with this system, enabling delivery personnel to service a greater number of retail customers in a given region, complete their routes in less time, and service expanded territories.

THE DRAWINGS

A presently preferred embodiment of the invention is disclosed in the following description and in the accompanying drawings, wherein:

FIG. 3 is an schematic perspective rear elevational view of a transport system constructed according to the invention;

FIG. 4 is a diagrammatic top plan view schematically illustrating the positioning of the carts within the trailer;

FIG. 6A is a bottom perspective view of a mini-pallet constructed according to the present invention;

FIG. 7C is an enlarged fragmentary front elevational view showing details of the cart locking system;

Figure 6B:
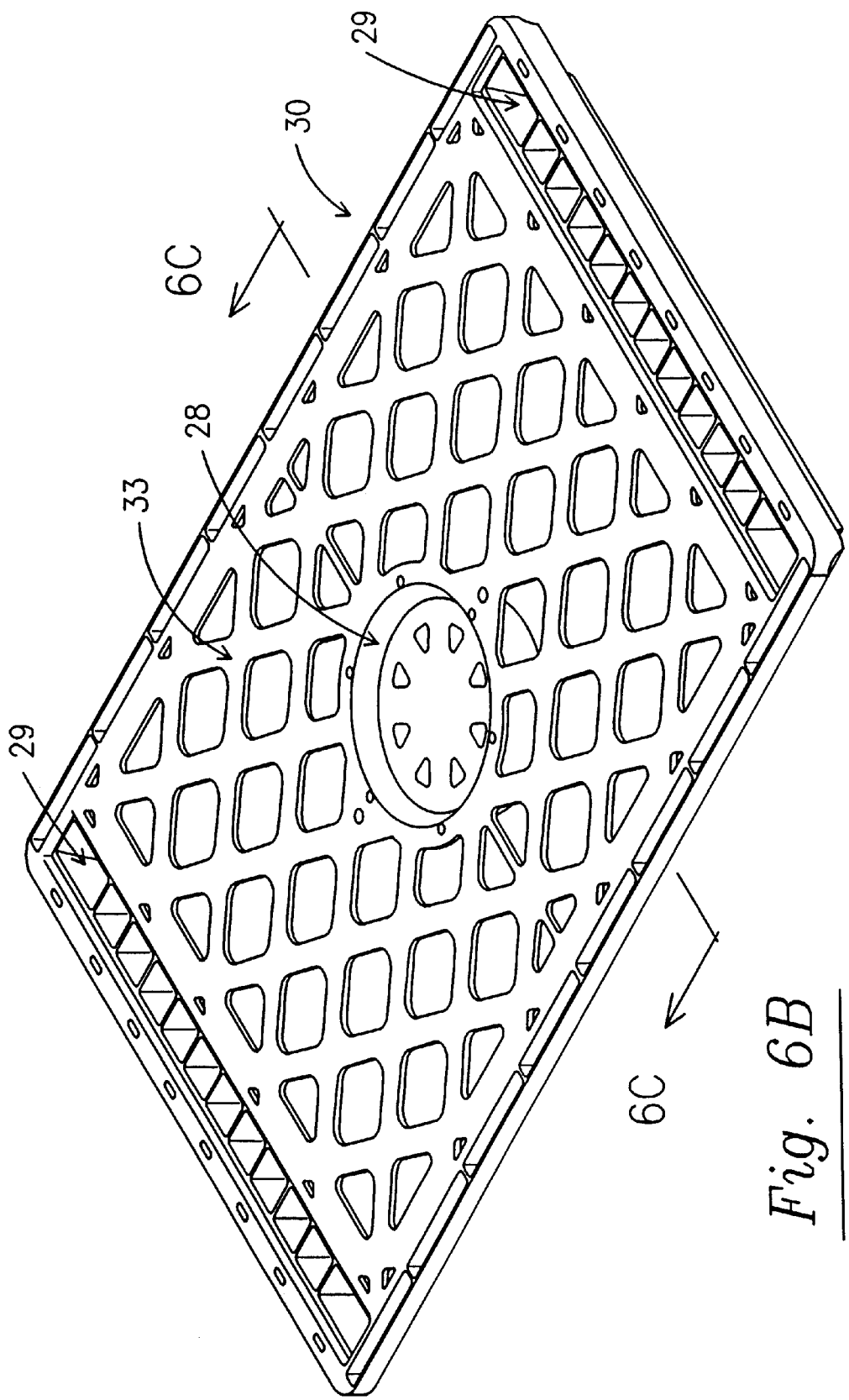
FIG. 6B is a top perspective view of a mini-pallet constructed according to the present invention.
Figure 6C:
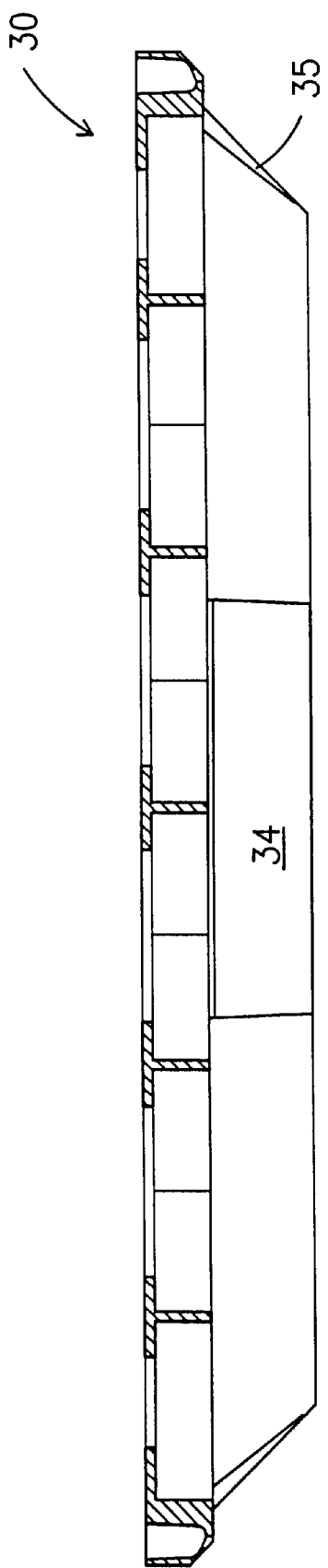
FIG. 6C is a side sectional view of the mini-pallet of FIG. 6B.
Figure 6D:
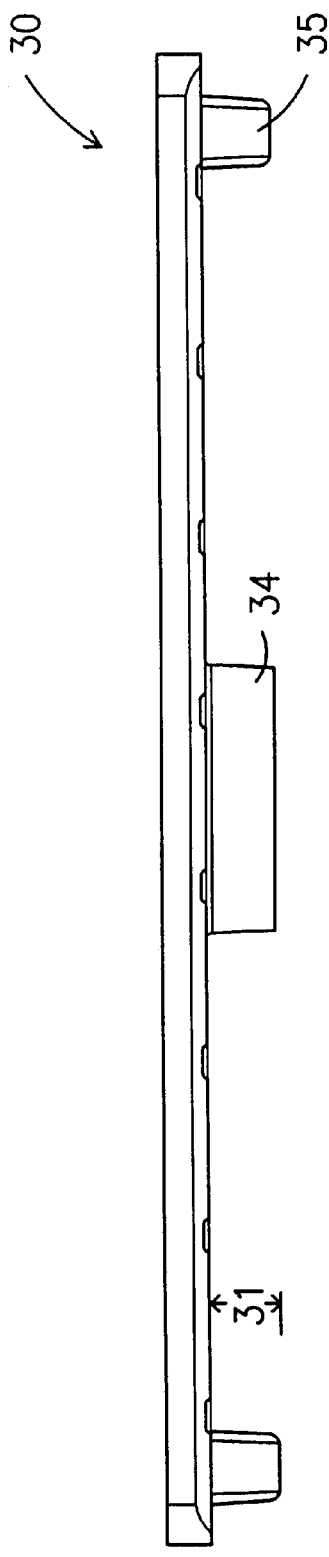
FIG. 6D is a front plan view of the mini-pallet of FIG. 6B.
Figure 9A:
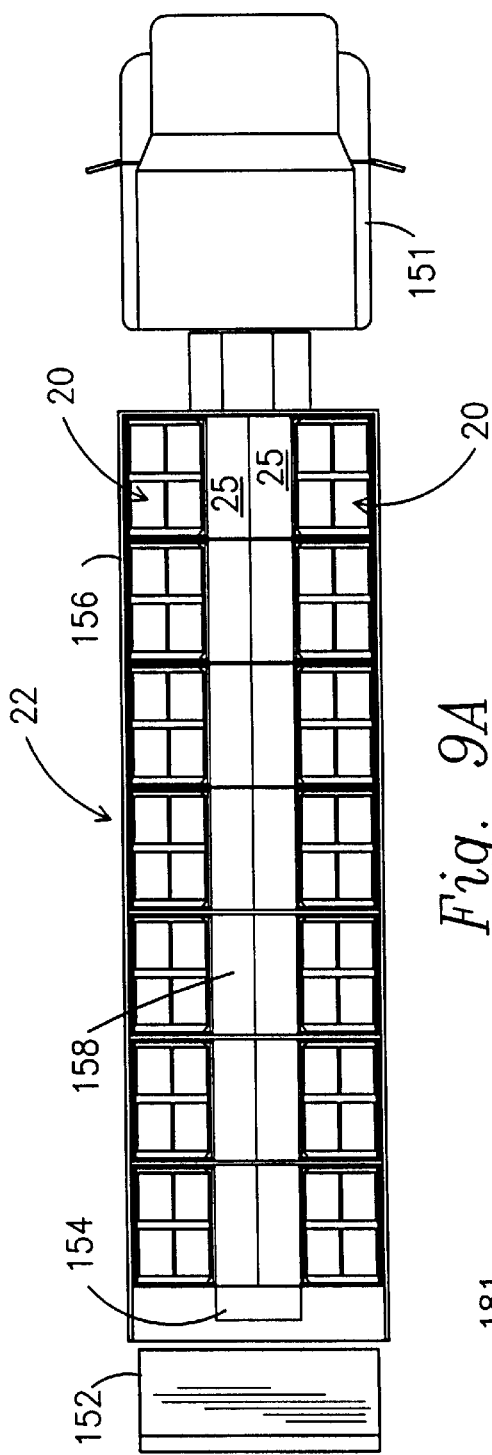
Figure 9G:
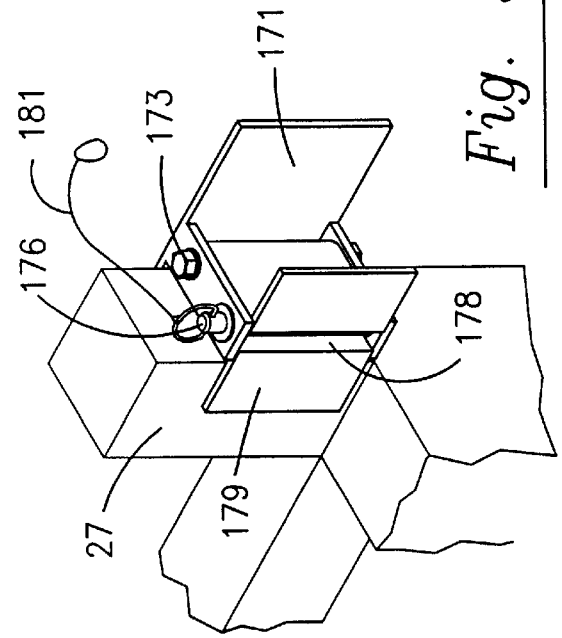
Figure 9F:
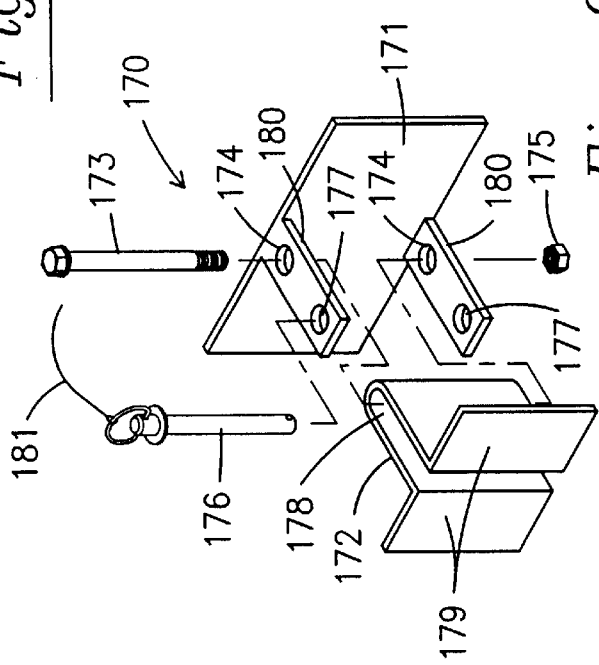
Figure 9B:
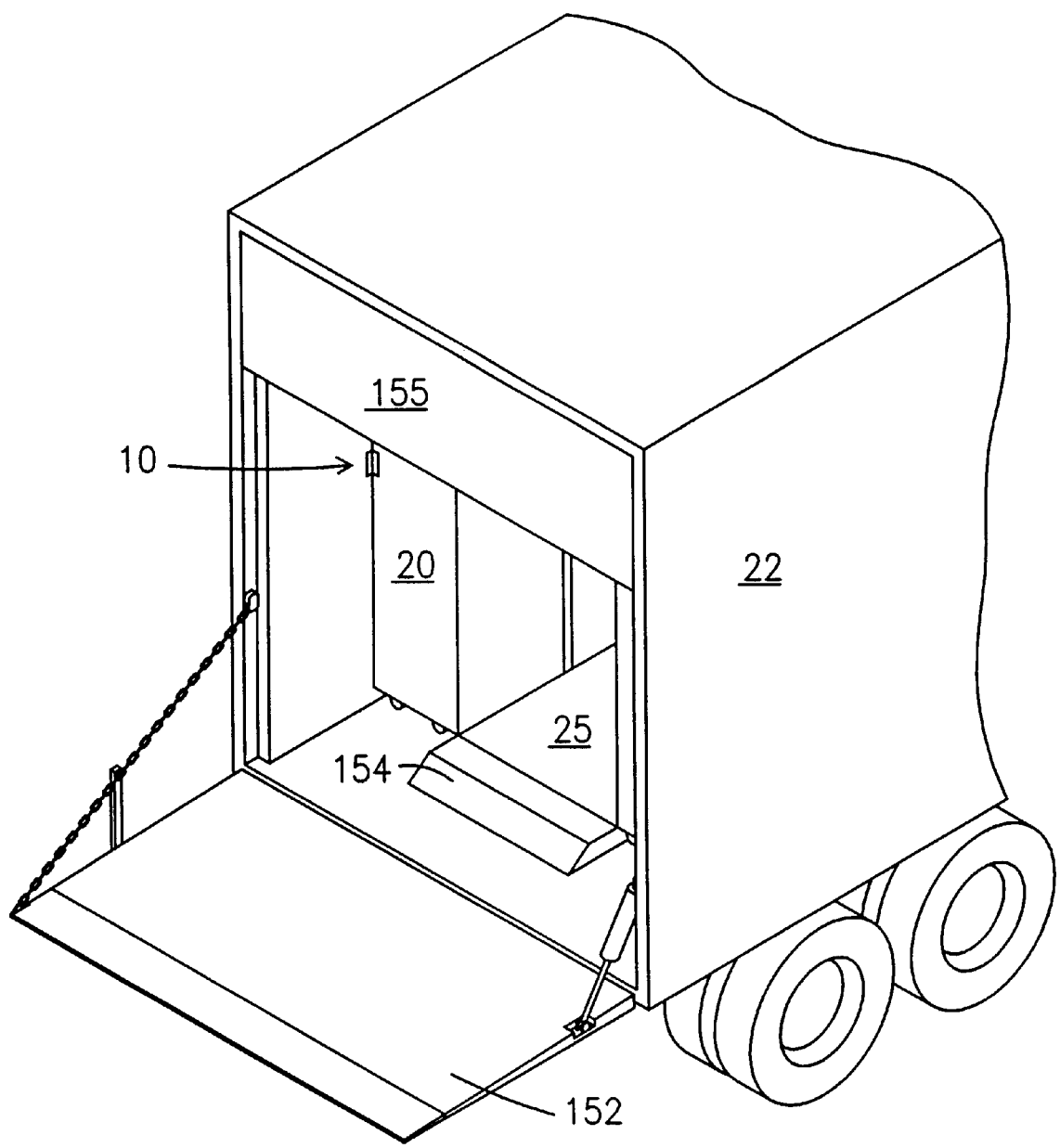
Figure 9C:
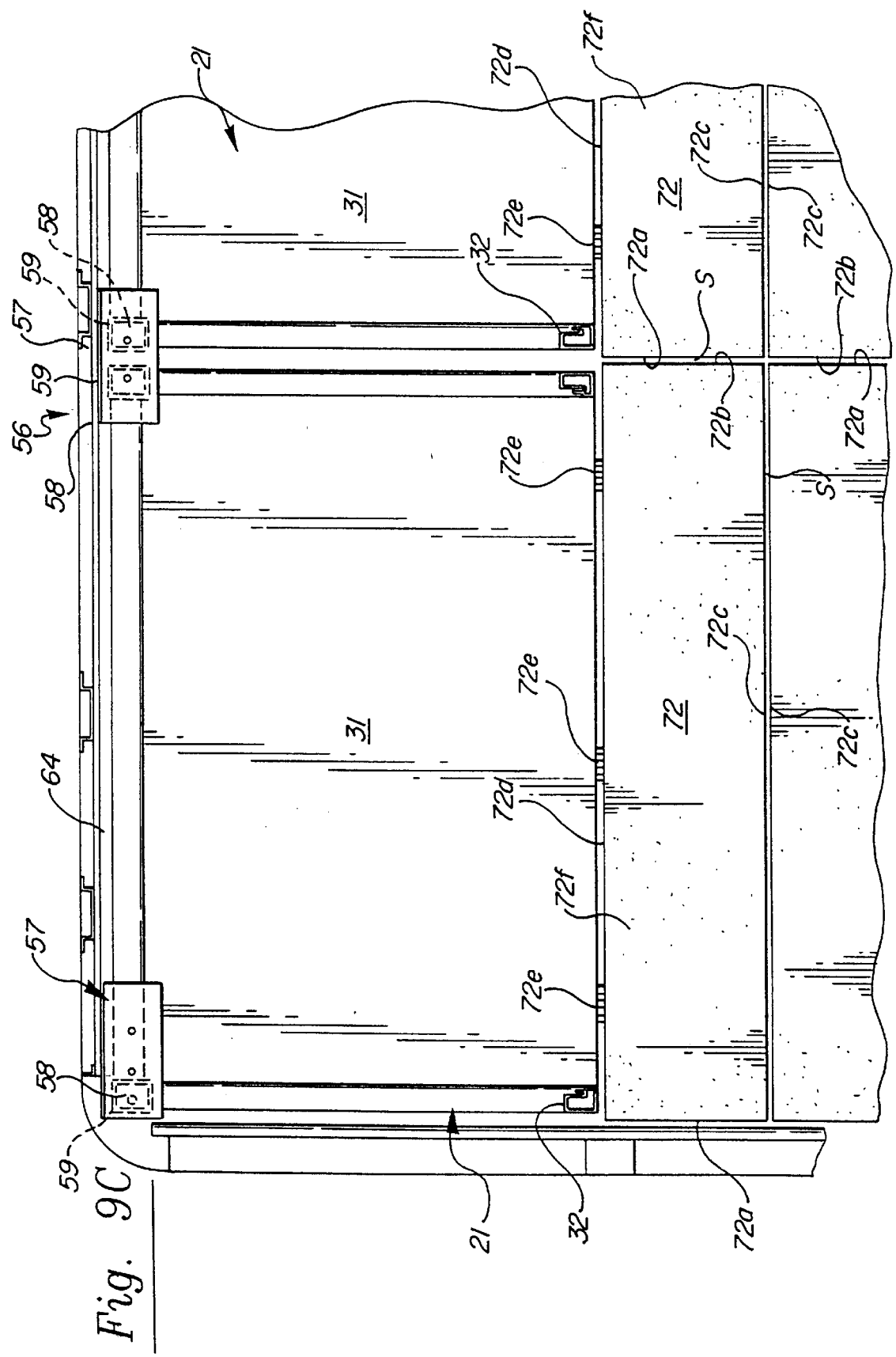

FIG. 8A a side elevational view of a hand truck having a nose plate constructed according to the present invention;

FIG. 8B is an enlarged fragmentary sectional plan view taken generally along lines 6B—6B of FIG. 6A; and FIG. 9A shows a schematic layout of a rear entry route delivery vehicle utilized with mobile beverage carts according to the present invention;

FIG. 9B is a perspective view of a powered gate on a rear entry route delivery trailer according to the present invention;

FIG. 9C is an enlarged fragmentary plan view showing details of the cart lock system;

FIG. 9D is a fragmentary side elevational view showing details of the cart locking system.

Figure 10A:
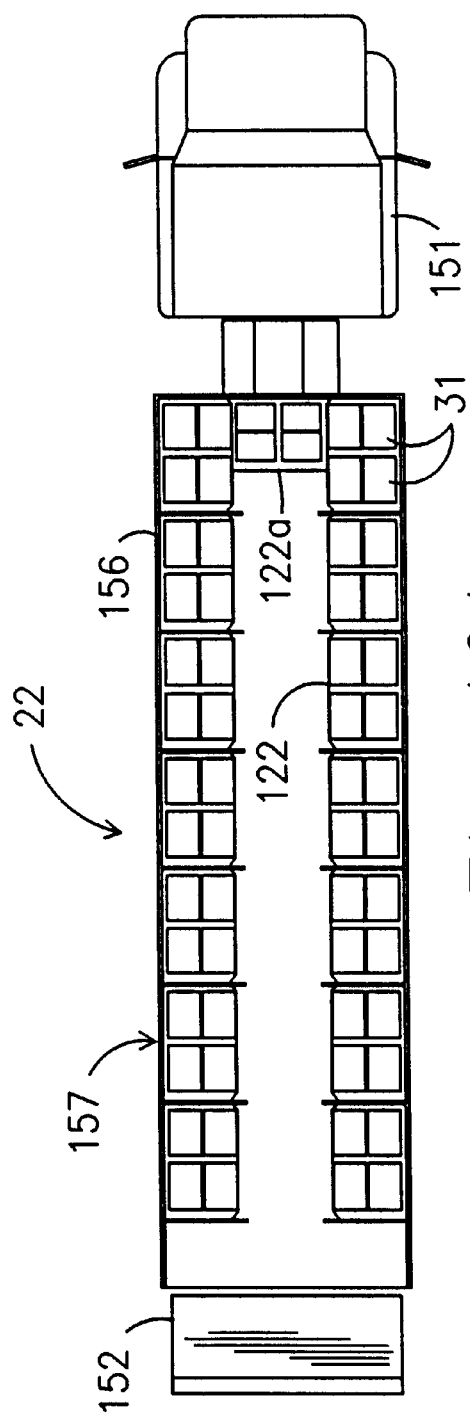
Figure 10B:
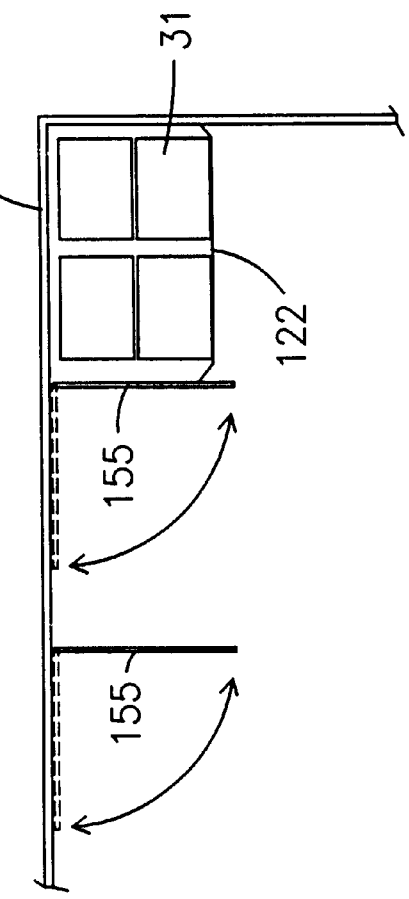
Figure 11A:
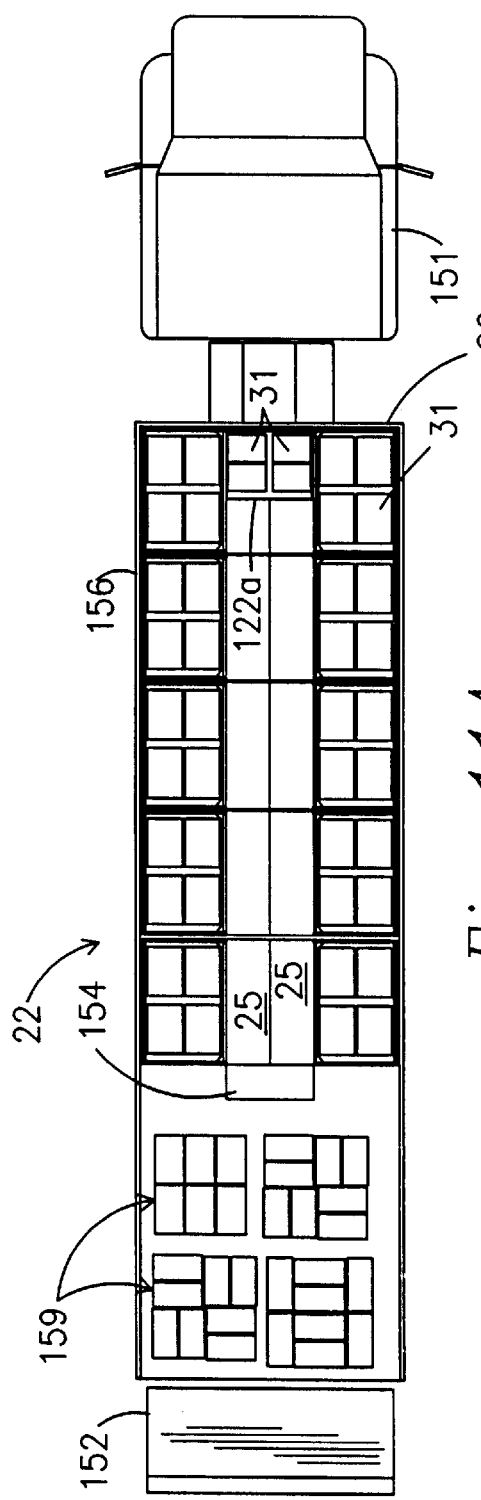
Figure 12:
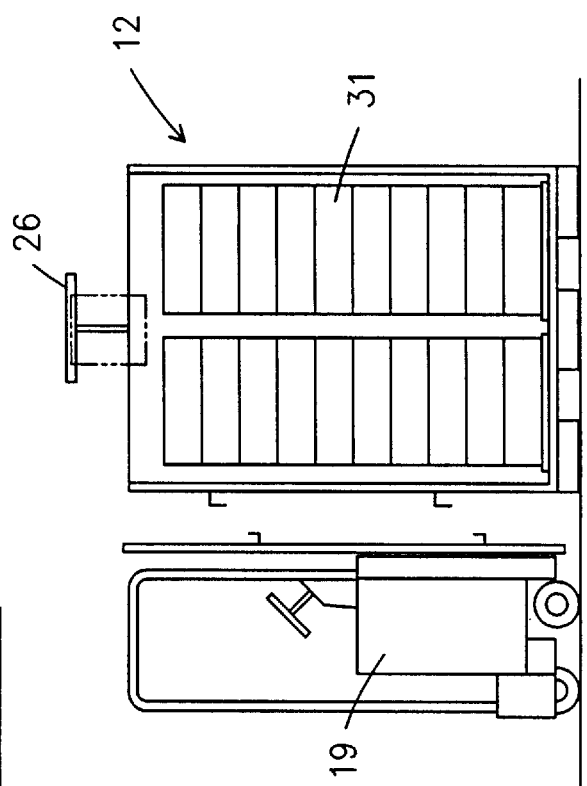

FIG. 9E is an enlarged fragmentary cross-sectional plan view taken generally along lines 9E—9E of FIG. 9D;

FIG. 9F is an exploded view of an alternative pin latching system utilized to hold mobile beverage carts to the delivery trailer wall according to the present invention;

FIG. 9G shows the latching system of FIG. 9F restraining a corner post of a mobile beverage cart;

FIG. 10A is a schematic layout of a rear entry route delivery vehicle according to the present invention, which utilizes folding bay walls to contain beverage pallet stacks according to the present invention;

FIG. 10B details the folding bay wall structure of the trailer of the rear entry route delivery vehicle of FIG. 10A;

FIG. 11A is a schematic layout of a rear entry route delivery vehicle configured for combination bulk and route delivery;

FIG. 11B is an enlarged fragmentary cross-sectional view taken generally along lines 11—11 of FIG. 4;

FIG. 12 shows a side plan view of an alternative mobile beverage cart utilized with a forklift rather than casters.

Figure 14:
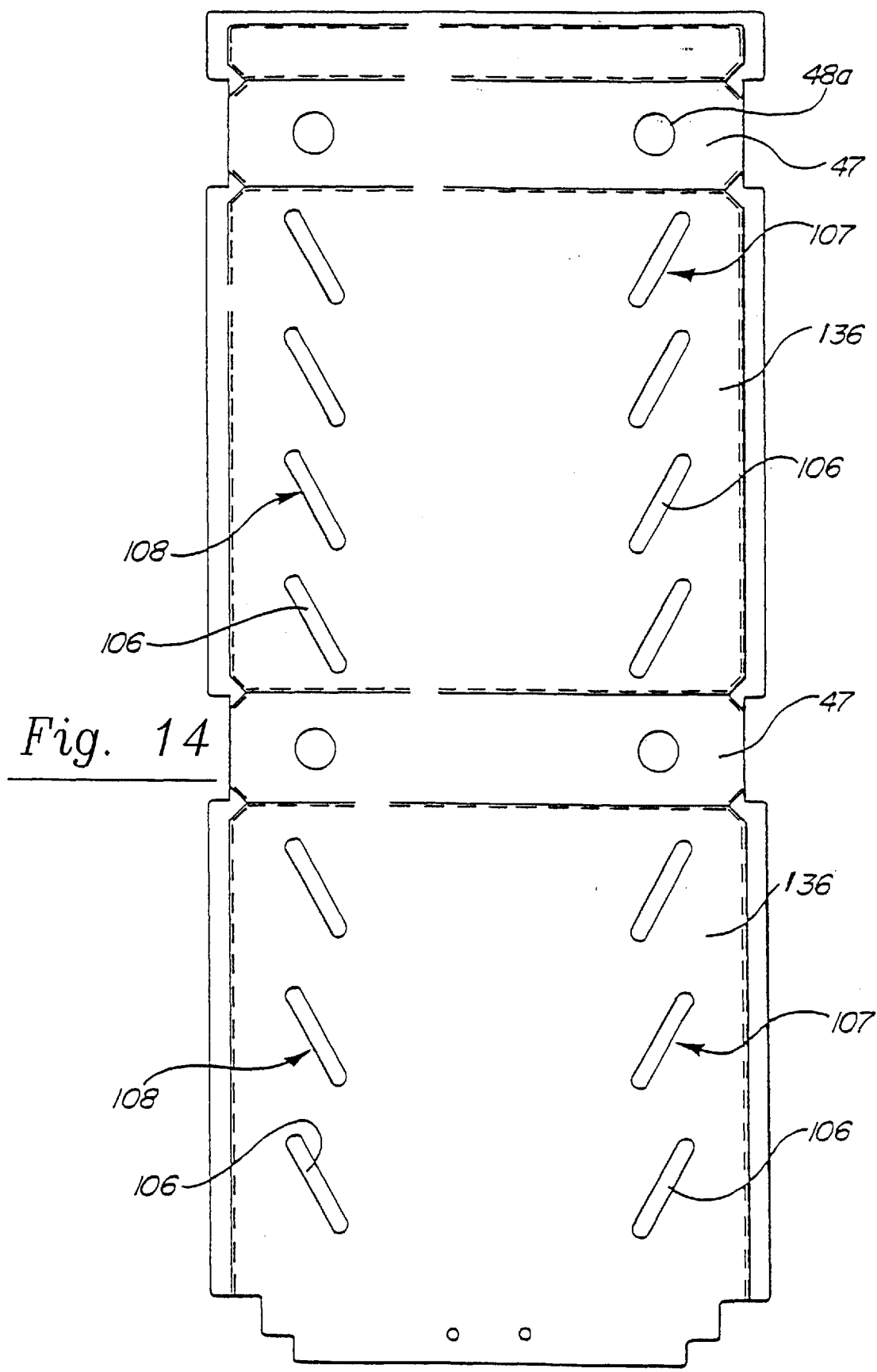

FIG. 13 is an enlarged fragmentary elevational view of an accompanying ramp constructed according to the invention;

FIG. 14 is an elevational view of a modified cart side and back wall.

DETAILED DESCRIPTION

Figure 1:
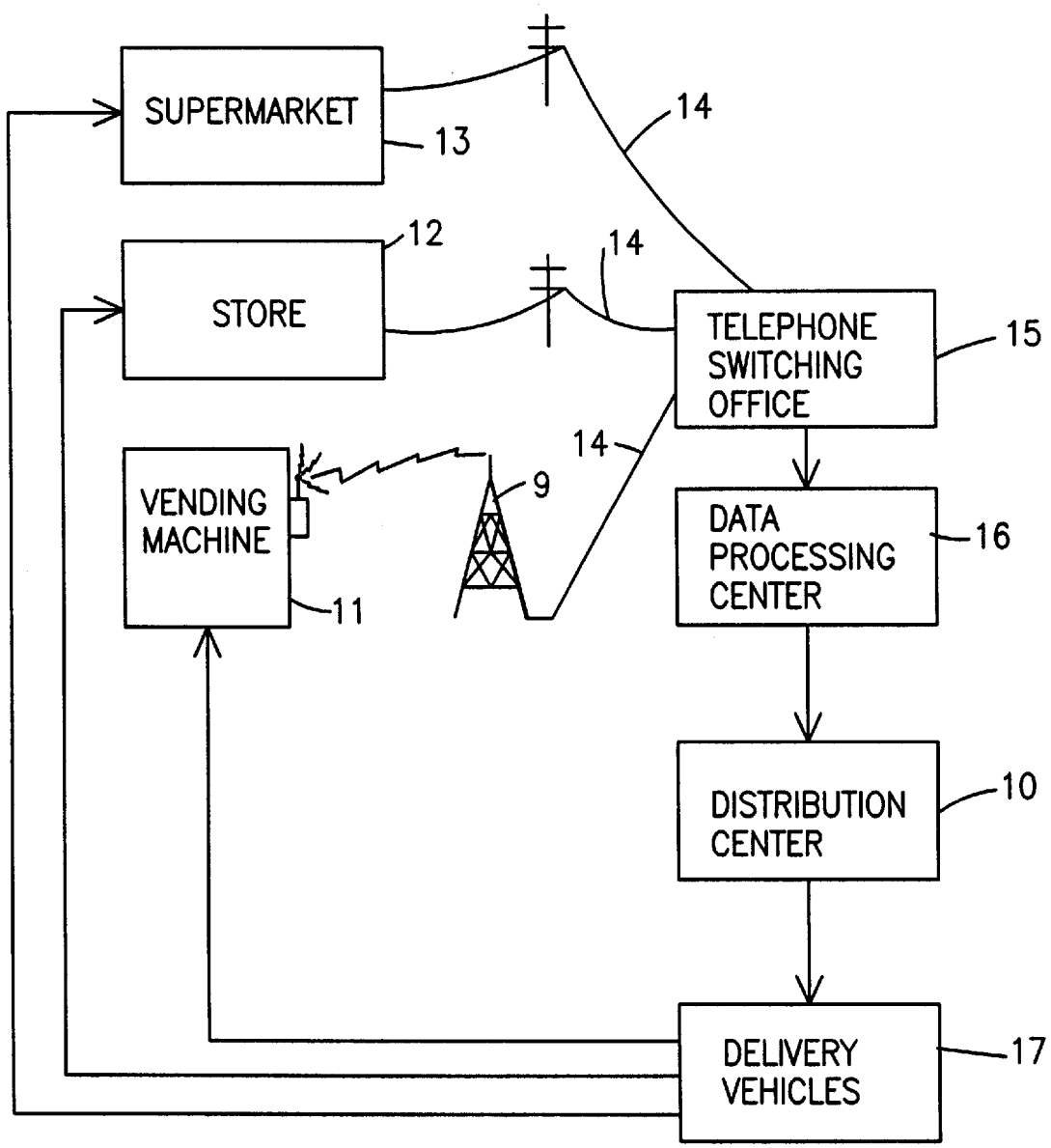
FIG. 1 is a schematic illustration of the ordering and delivery process in an advanced order fulfillment system.

FIG. 1 shows the communication which takes place prior to the loading and delivering of beverage products according to the present invention. Specifically, bulk customers such as mass-market and supermarket stores 13 with loading docks, smaller retailers accepting delivery at ground level 12, and even individual vending machines, communicate their product needs by telephone 14 as illustrated, computer networks and satellite linkages to the data processing facilities 16 of the beverage manufacturer. The order information is processed at the data center 16 and made available to the personnel in the beverage warehouse 10. Traditionally, both bulk delivery tractor-trailer trucks for mass-market and supermarket stores and side load route trucks for smaller accounts would be utilized as delivery vehicles 17. However, according to the present invention, both bulk and route accounts may be delivered from the same trailers. Accordingly, a preferred delivery trailer will comprise a 28'-6" long rear entry trailer, typically with a 102" outer width and 98" inner width. The trailer requires approximately 12-½' road clearance. The trailer is provided with a rail-type lift gate, which is ICC bar and dock lock compatible. Preferably the lift gate will be able to proceed from up to down location within 15 seconds, and have a capacity of 3,500 to 4,000 lbs. The gate should have approximately a 5' deep work area, with a 16" taper downward toward the ground. Also, it is preferable that the ramp operational controls travel with the operator. An optional curbside ramp may also be provided.

Figure 2:
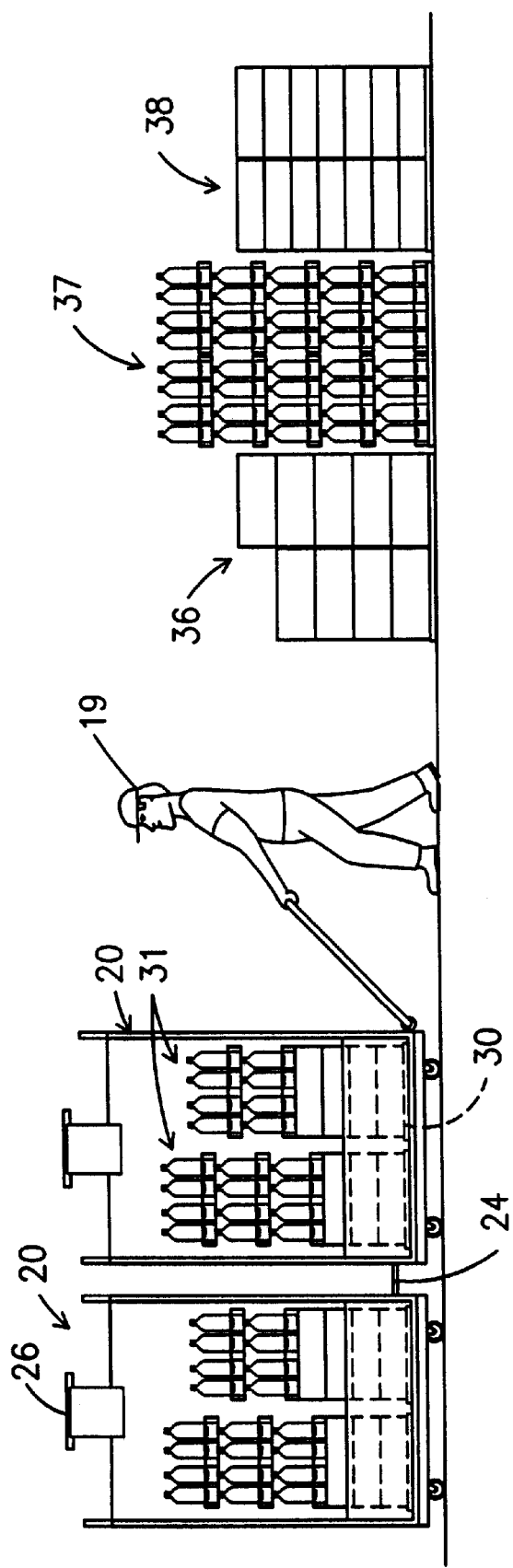
FIG. 2 shows mobile beverage carts according to the present inventions being used to gather selected beverages by account order in a beverage warehouse facility.

FIG. 2 illustrates one method of utilizing the mini-pallets 30 and mini-pallet containers 21 according to the present invention to prepare account orders for loading in delivery vehicles. A person designated as the order filler 19 for a particular route will be provided with a printout or handheld computer display showing the orders of each customer on the route. Preferably the printouts will then be attached to clips 26 on the mobile beverage carts 21 for easy reference during picking and delivery. The order filler 19 will take an empty mobile beverage cart 21 and place four stacks including mini-pallets 30 on the floor of that container 21. It will be understood that mini-pallet containers 21 could be configured for less or more stacks but four is a good compromise of weight, maneuverability and efficiency. Furthermore, a plurality of mini-pallet containers 21 could be joined together such as by connector 24. Each customer order is then built separately and column stacked 31 on one or more of the mini-pallets 30. Once the mini-pallet container 21 is full or the order is complete, the filler 19 may load a delivery vehicle 17.

It will also be understood that mini-pallet 30 product stacks 31 may be assembled by an automated processes rather than the manual pulling of mini-pallet containers 21 past appropriate warehouse beverage pallets 36, 37, 38 as illustrated in FIG. 2. Instead, layers of product or individual product cases may be picked and placed on a conveyer system and released either manually or by recognition from a vision scanner to the appropriate location to create each product stack 31 on mini-pallets 30. Appropriately configured products stacks 31 may then be loaded on their mini-pallets 30 either into mini-pallet containers 21 or directly onto a delivery vehicle 17.

A product support and delivery system constructed according to the present invention is shown generally at 20 in FIGS. 3 and 4 and comprises a plurality of wheeled modules or carts 21, positionable within a van trailer 22 along opposite side walls 123 thereof on a floor 124 of the trailer 22 in longitudinally extending rows $R^1$, $R^2$ which extend from a front wall 125 of the trailer 22 toward the back 126 thereof. Space is provided between the adjacent rows $R^1$, $R^2$, defining a center aisle A for accommodating the passage of a hand truck 127 (FIGS. 8A, 8B) used by an operator to remove multiple mini-stacks of palleted containers 31 from the carts 21 for transport to a retail sales facility.

Figure 7A:
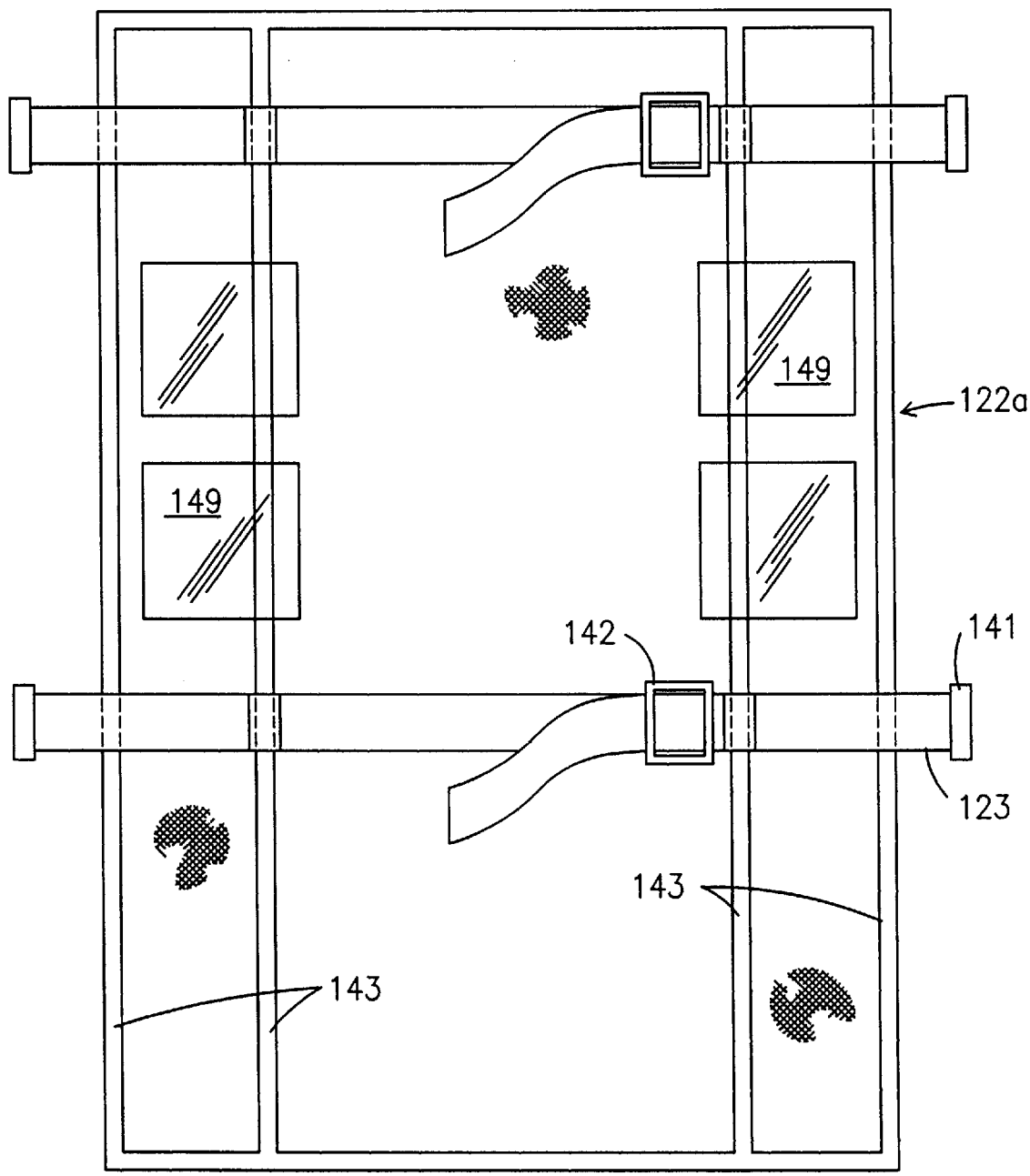
FIG. 7A shows a flexible restraining door adapted for use across the aisle of a trailer according to the present invention or otherwise to restrain product on mini-pallets not located in a mobile beverage cart.

The interior of the trailer 22 is preferably wood with an E-track on the sides and front. The walls and ceiling should be insulated and there should be interior light with a light switch inside the trailer 22. Typical trailers 22 shown in FIGS. 3, 4, 9A, 9B, and 11A will hold 7 mobile beverage carts such as mini-pallet containers 21, 121 as illustrated in FIGS. 3, 4 and 7A, along each side, and the center aisle may be utilized to hold pallets to form a false bottom and a curb ramp 154. Optional equipment will include a heater, an automatic trailer door opener, a box for deposit returns, and pineal hooks in order to allow a single tracker to pull two or three trailers.

Turning now to the construction of the cart 21, and with reference to FIGS. 5, 7C, 9C and 11B, and initially to FIG. 5, the identical carts 21 each include a rigid frame structure provided by a rectangular base frame 28 mounting a set of four caster wheels 29, one of which is lockable via a lock pin mechanism 130 (FIG. 5C) to preclude normal movement of the cart 21 when locked. A floor or product support member 131 on the cart 21 is carried by the base frame 28 to provide a surface above the van floor on which the stacked containers 31 are supported. A set of front 32 and back 33 vertical corner rails are fixed at their lower ends to the corners of the base frame 28 and extend upwardly therefrom. They are interconnected along three sides adjacent their upper ends by upper side 34 and back 35 cross rails.

Figure 5A:
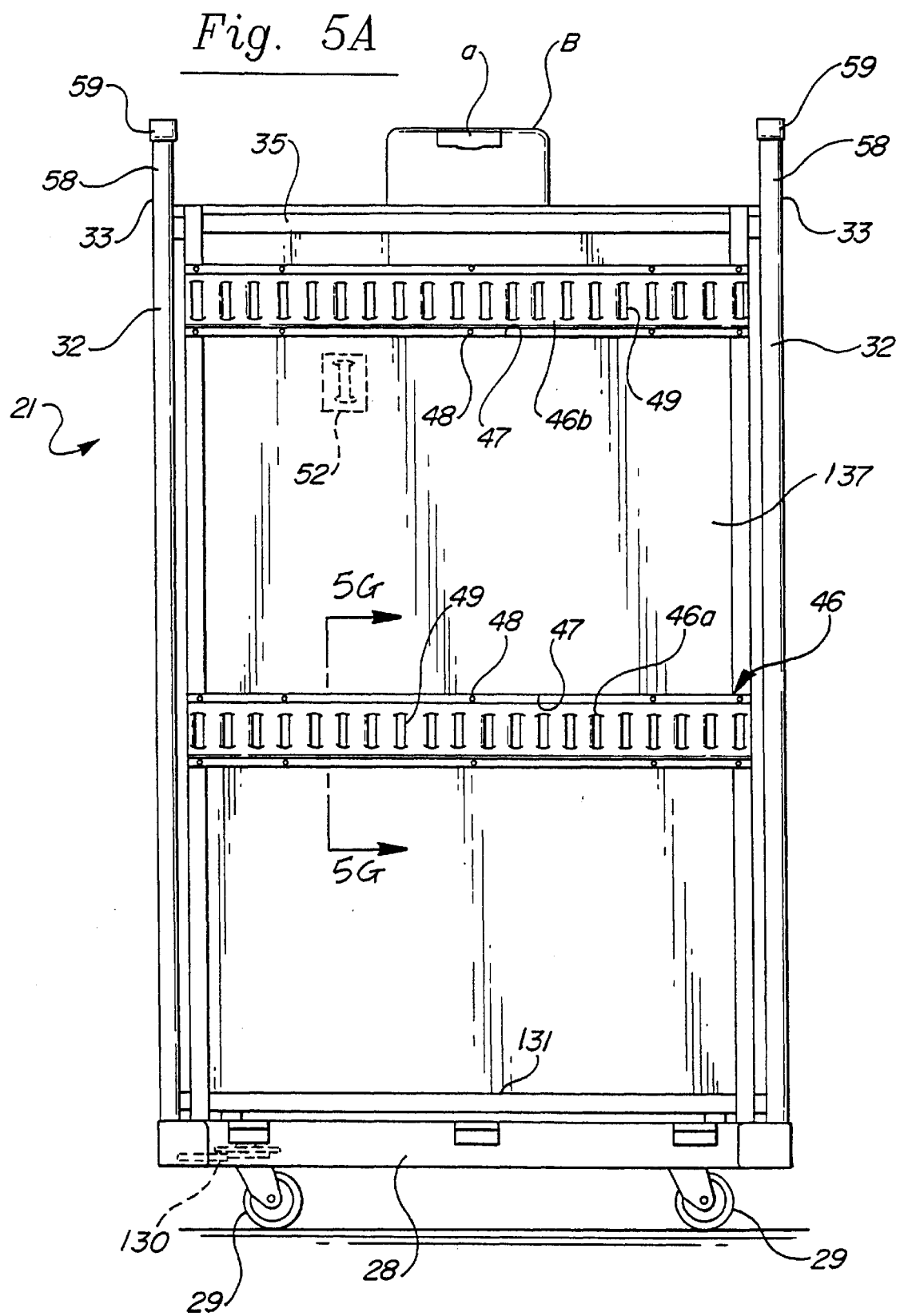
FIG. 5A is a front elevational view of a transport cart constructed according to a presently preferred embodiment of the invention.
Figure 5B:
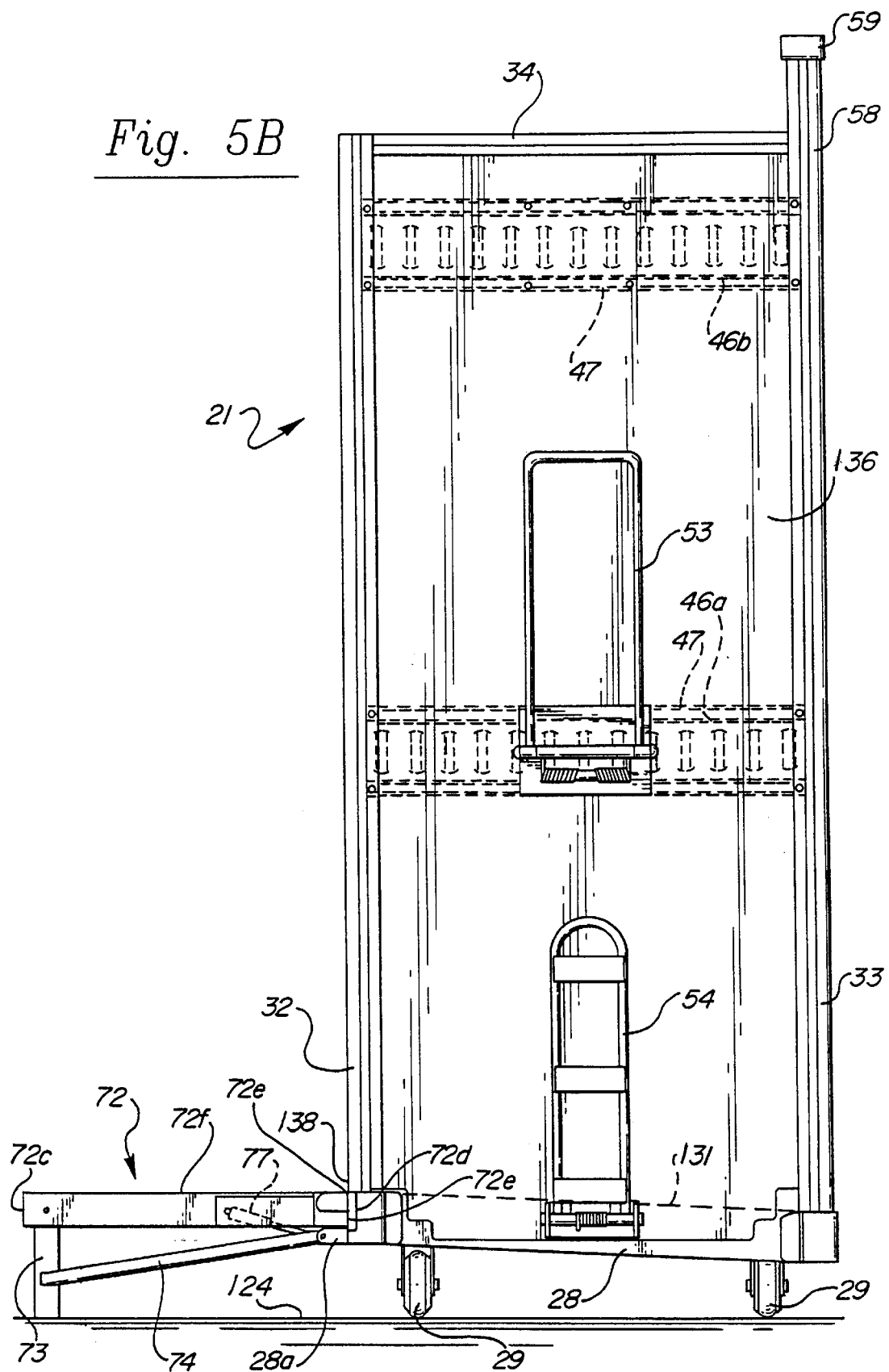
FIG. 5B is an elevational view of a leading side of the cart of FIG. 5A.
Figure 5C:
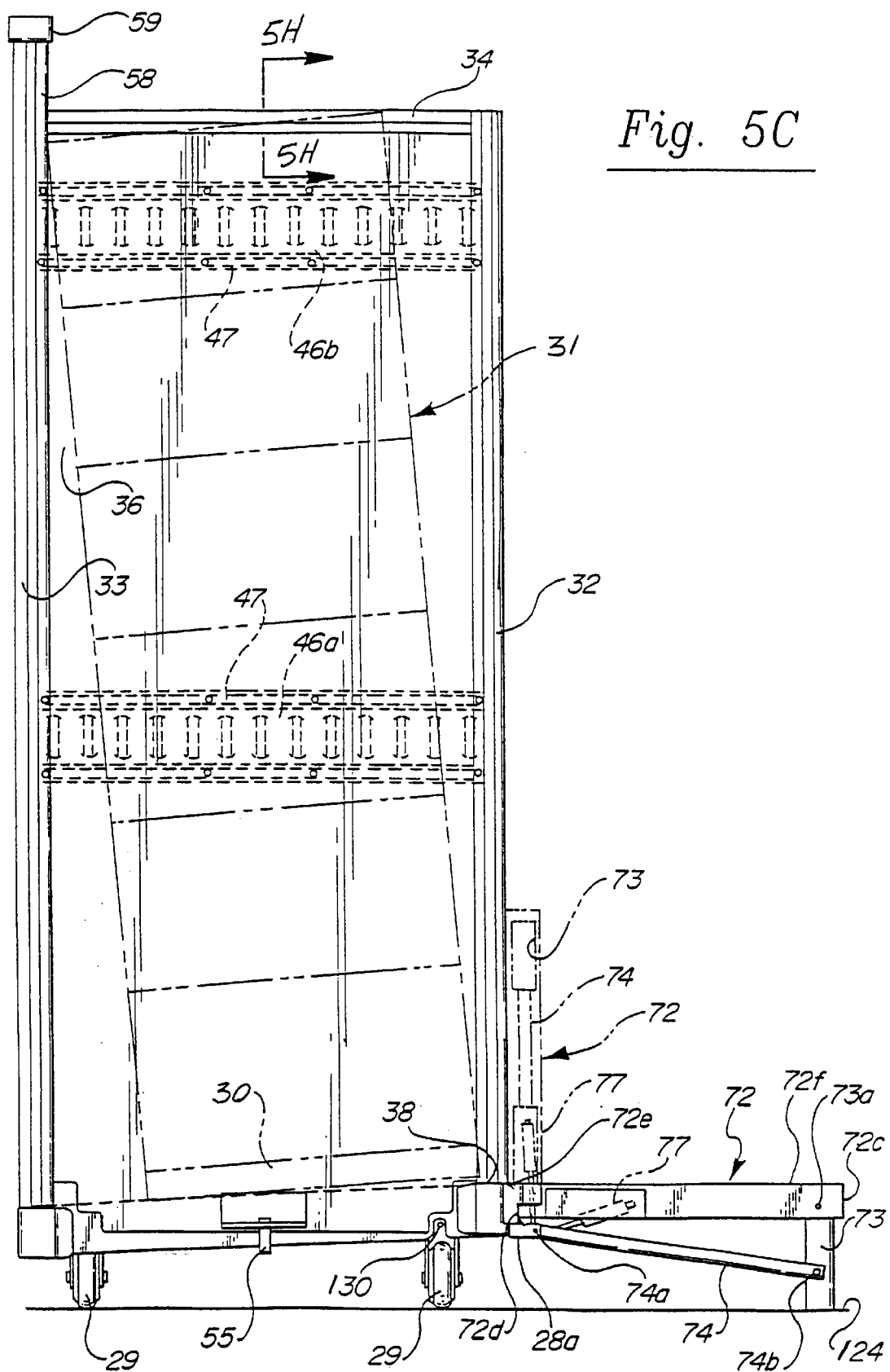
FIG. 5C is an elevational view of the opposite trailing side of the cart of FIG. 5A.

Each cart 21 is closed on three of its sides and incorporates a pair of side panels 136 and a back panel 137. The front 138 of the cart 21 is open to permit loading and unloading of the stacked containers 31 (FIG. 5C) from the cart 21. The side and back panels 136, 137 are secured to the framing of the cart and may be fabricated from any of a number of tough, generally rigid materials, such as aluminum plating or synthetic plastic sheets. The panels 136, 137 are preferably molded organic polymeric structures fabricated from materials such as a heavy gauge thermoformed polypropylene or polyethylene, engineered plastics, or the like, to provide lightweight, durable, corrosion resistant, readily cleanable walls for the cart 21. FIG. 5H illustrates the preferred manner of securing the panels 136, 137 to the rails 32–35 and base 28. The rails 32–35 are preferably formed as extrusions and include a channel or groove 39 in which a peripheral tongue 40 on the panels 36, 37 is received, such that the panels 136, 137 are captured and permanently retained by the base 28 and rails 32–35 without need for fasteners.

The floor 131 of the cart 21 is preferably angled so as to tilt downwardly from the front 138 toward the back 137 of the cart 21 at an angle of about 3 to 5 degrees. The slight angle of the floor 131 serves to tilt the stacks of containers 31 inwardly of the carts 21 away from the aisle A to stabilize the load during transport, as illustrated in FIG. 5C.

Figure 5D:
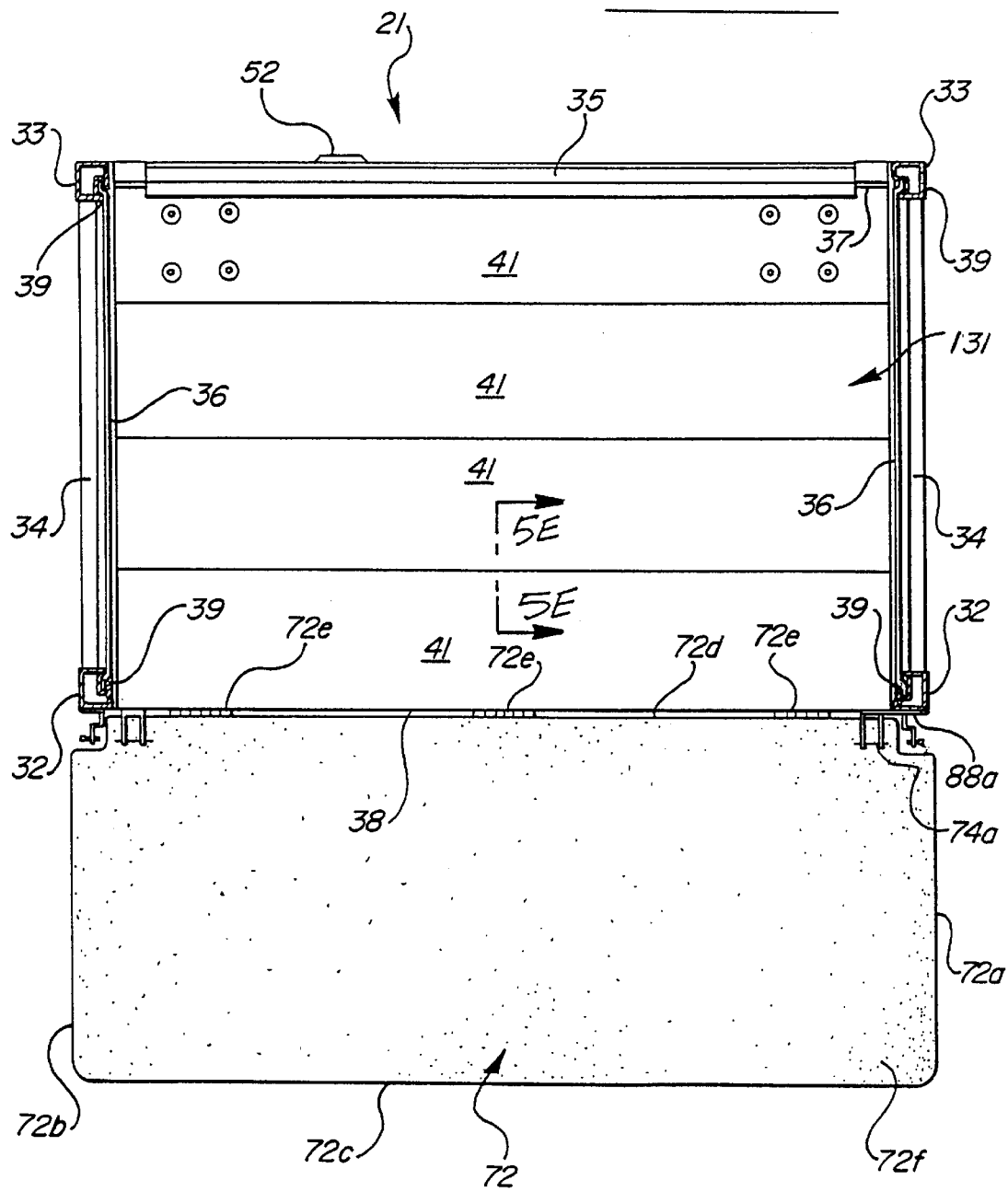
FIG. 5D is a top plan view of the cart of FIG. 5A.
Figure 5E:
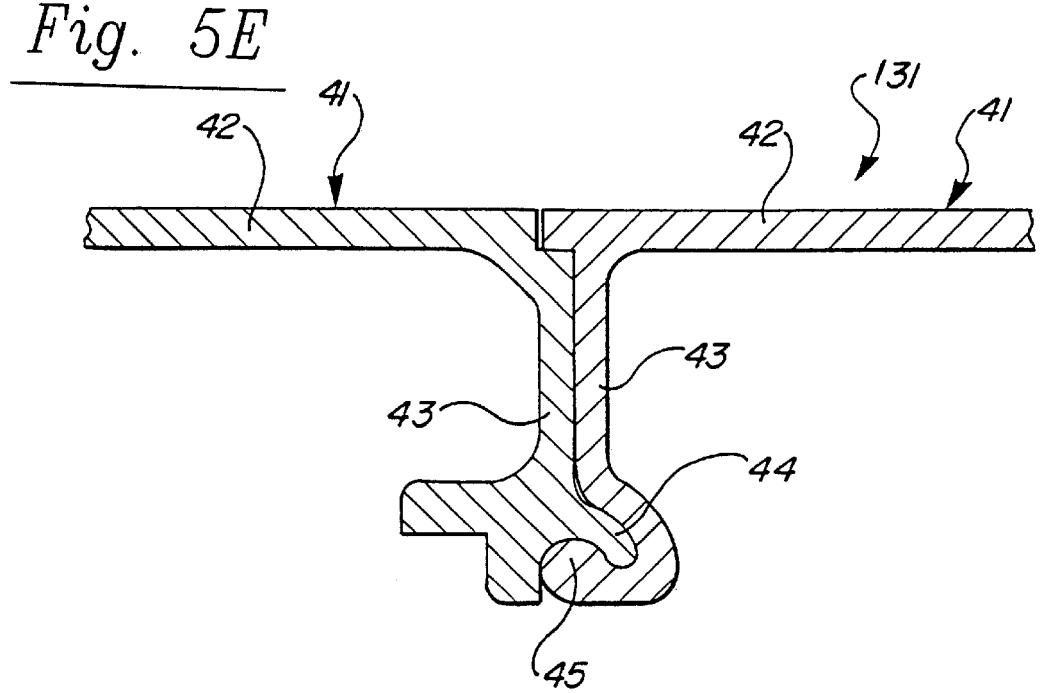
FIG. 5E is an enlarged fragmentary cross-sectional view taken generally along lines 5E—5E of FIG. 5D.

Referring to FIGS. 5D and 5E, the floors or bottom supports 131 of the carts 21 are preferably fabricated from a series of elongate floor sections 41, each having a flat load-supporting upper wall 42 and underlying beam formations 43 along their edges. The beams 43 of adjacent panels have interlocking portions 44, 45 (FIG. 5E) that, when interfitted, join the panels 41 to provide a continuous reinforced floor surface 31 which is secured to the base frame 28, such as by welding or with mechanical fasteners. The interior space of each cart 21 is sized to accommodate multiple, and preferably four, mini-stacks of the containers 31, each supported on an associated mini-pallet 30, as illustrated diagrammatically in FIG. 5C.

Figure 5F:
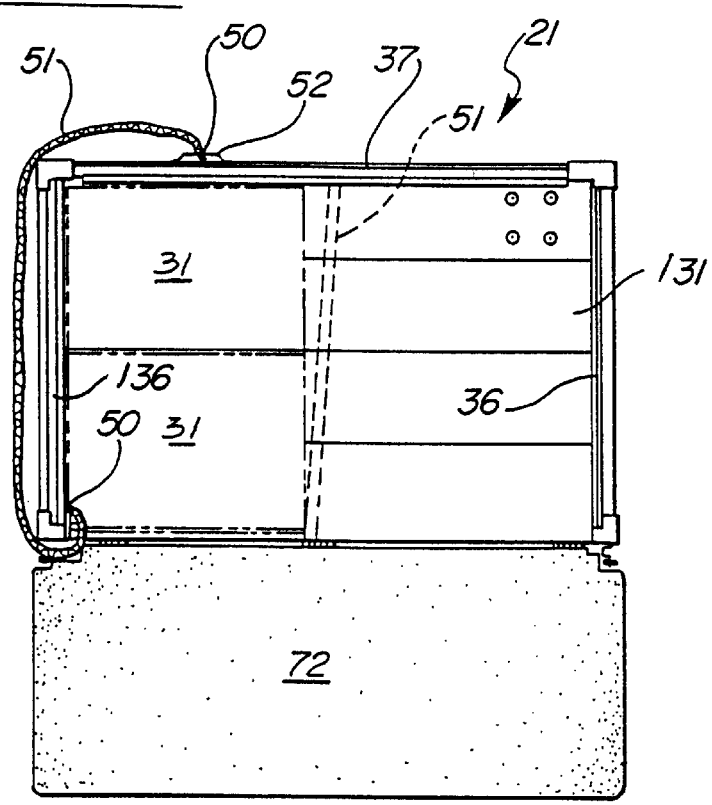
FIG. 5F is a top plan view like FIG. 6 but showing a cargo retention tarp in its use and stowed positions.
Figure 5G:
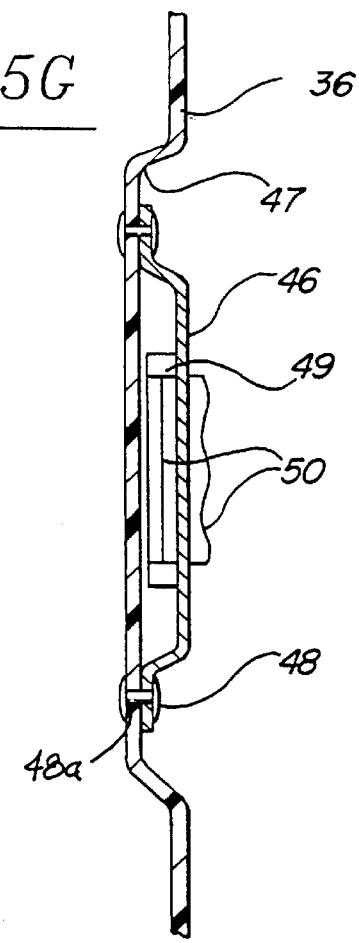
FIG. 5G is an enlarged fragmentary sectional view taken generally alone lines 5G—5G of FIG. 5A.
Figure 5H:
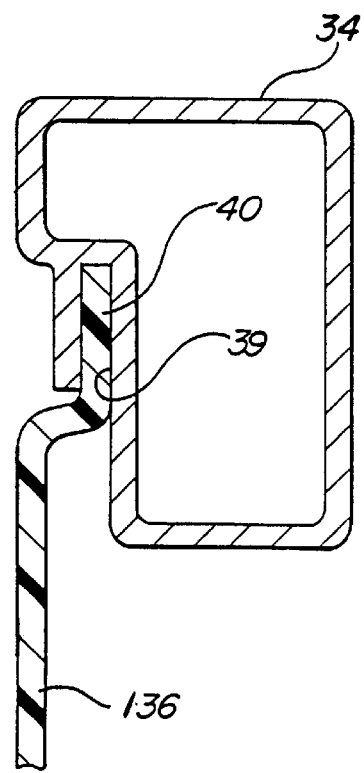
FIG. 5H is an enlarged fragmentary cross-sectional view of a portion of the cart, taken generally along lines 5H—5H of FIG. 5C.

Two rows of commercially available E-track 46a, 46b extend horizontally along and are secured to the interior surface of the side 136 and back 137 panels. One row 46a is located about midway up the panels 136, 137, and an upper row 46b is located adjacent the upper ends of the panels 136, 137. The E-track 46 is accommodated within recesses or channels 47 formed in the panels 136, 137, as illustrated in FIG. 5G, such that the face of the E-track 46 lies generally flush with the inner surface of the panels 136, 137. The E-track sections 46 may be joined to the panels 36, 37 by means of rivets 48 or the like extending through openings 48a. The tracks 46 have a series of punched out openings 49 that receive angular end hooks or clips 50 (FIG. 5F) secured to the opposite side edges of a retaining tarp or curtain 51. The tarp 51 can be removed from the stowed position shown and, as illustrated diagrammatically in broken lines in FIG. 5F, the tarp 51 is operative to wrap about a partial load to assist in securing the stack of containers from tipping forwardly out of the carts 21 during transport. The full extension of the E-track 46 across the side 136 and back 137 panels enables the tarp 51 to secure virtually any size load. The general use of an E-track 46 and curtain 51 securement system is known, per se, for retaining cargo in a trailer.

When loading the palleted containers 31 into the carts 21, it is desirable to have the curtain 51 positioned clear of the open front 138 of the cart 21 so as not to interfere with loading. As shown in FIGS. 5A and 5F, the back panel 137 of the cart 21 is fitted with the keeper bracket 52 on the exterior side thereof in position to receive and releasibly retain the upper end clip 50 of the curtain 51 when not in use. As illustrated diagrammatically in FIG. 5F, extending the curtain 51 exteriorly of the cart 21 around to the back of the cart 21 enables the end clip 50 to be secured in the keeper 52 to support the curtain 51 clear of the open front 138 during loading.

As shown best in FIG. 5B, the leading side of the cart 21 is fitted with an upper pull handle 53 and lower tow bar 54 which are shown spring biased to a stowed position against the side panel 136, but which are swingable outwardly of the side panel 136 to an extended position to facilitate handling of the cart 21. As shown in FIG. 5C, the trailing side of the cart 21 is fitted with a hitch pin 55 projecting downwardly from the base frame 28 and operative to receive and releasibly retain the tow bar 54 of another cart to enable a number of the carts 21 to be trained together for transport.

In use, a plurality of the carts 21, located at a manufacturing or distribution center, are loaded with one or more mini-stacks of the containers 31 according to the brand and quantity called for by the particular retail orders to be delivered on a delivery route. The illustrated carts 21 are designed to hold four such mini-stacks of containers 31 two deep and two wide within the bay of each cart 21 as illustrated in FIG. 4. In this way, each order is preassembled on the mini-pallets 30 and loaded onto the carts 21 in preparation for delivery to the retail sites. The location of each order is recorded such that an order might be contained in cart 4, pallet 2, for example. The carts 21 are equipped with a clip board B (FIG. 5A) secured thereto, with clip 26, for holding written records.

Figure 7B:
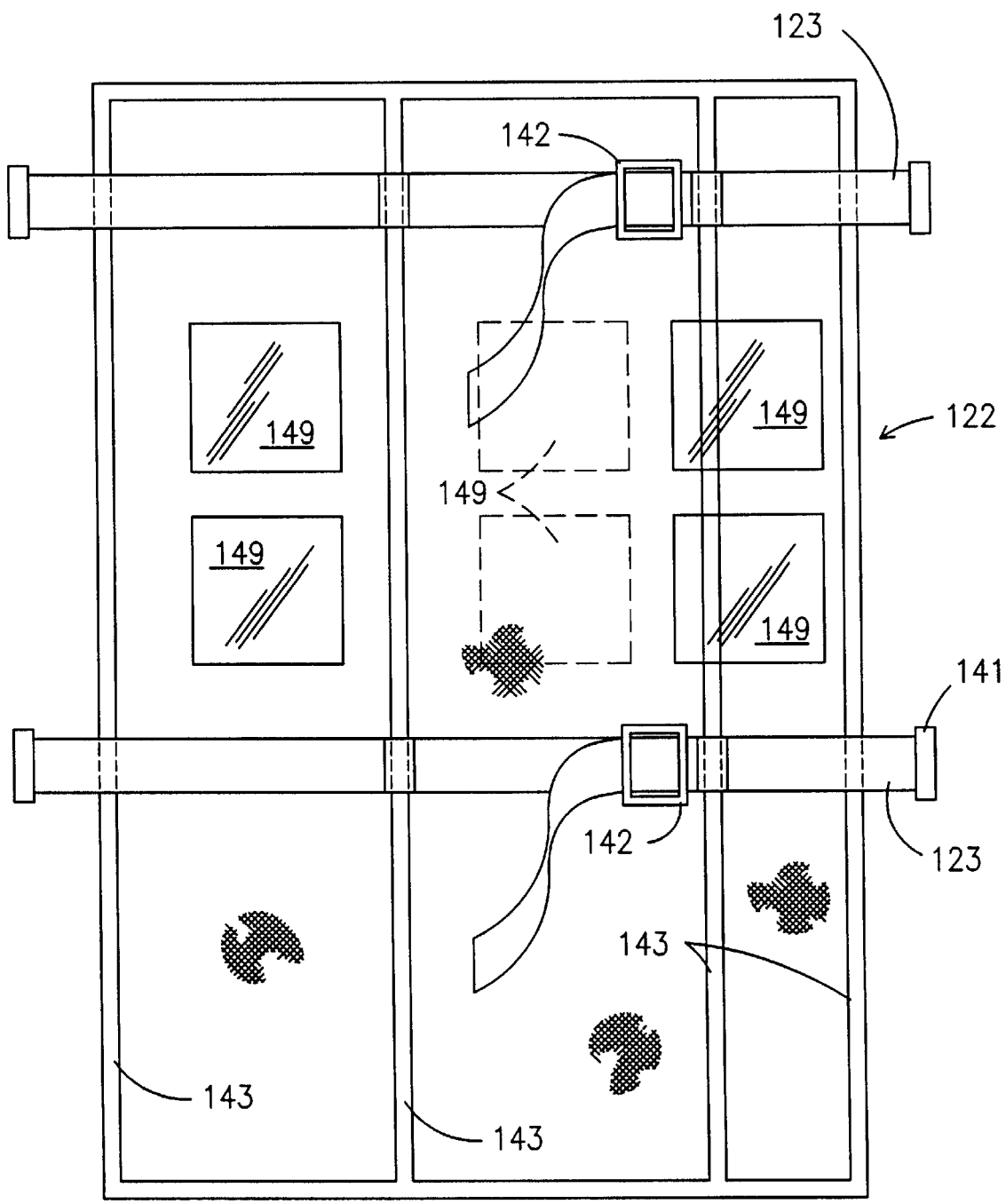
FIG. 7B shows a flexible restraining door adapted for use with a mobile beverage cart according to the present invention.

FIG. 7B shows a canvas panel 122 in detail with straps 123, ending at E-track buckles 41 and having tightening buckles 142. The panel 122 is also fitted with a plurality of see-through pockets 149 on each side which may be used in lieu of the clip 26 to hold customer order information. Flexible doors 122 may optionally be fitted with E-track clip pieces 140 to permit modified flexible doors 122a shown in FIG. 7A to be utilized to secure mini-pallets loads 31 in the aisle of the trailer as shown in FIGS. 10A and 11A. The preferred embodiment of a canvas panel 122 is about 5' in height and about 39" in width with a plurality of battens in batten pockets 43 to provide vertical rigidity. In addition to batten pockets 143 at the edges of canvas door 122, there is an additional batten pocket inset approximately 16" from the left side and another batten pocket inset approximately 7" from the right hand side. The canvas strap 123 will typically overhang the width of the canvas panel section by approximately 5" on each side. The alternative canvas door 122a utilized across the trailer aisle is typically approximately 54" in width with the middle batten pockets inset approximately 7" from each side.

Returning to the loading process, once the mini-pallet container 21 has been loaded and the product secured with canvas door 122 the mini-pallet container 21 is brought to the dock area where a checker will review the product in the container 21 against the pallet tickets attached to clip 26 or placed in pockets 149 for approval. Once approved, the mini-pallet container 21 is rolled into the trailer 22 and attached to the trailer wall as by a positioning lock system 56.

Once loaded, the carts 21 are wheeled into the trailer 22 and positioned end-to-end along the side walls 23 forming the two long rows $R^1$, $R^2$ of carts, as illustrated best in FIG. 2. The front-to-back depth of the carts 21 is dimensioned to leave space between the cart rows $R^1$, $R^2$ to define the center walkway or aisle 58 extending the length of the trailer 22. It is of sufficient width to accommodate the operator and a hand truck 127 (FIGS. 8A and 8B). The carts 21 are oriented such that their open fronts face the aisle 58. In the present example, the carts 21 have a depth of about 29 inches, providing the aisle 58 formed within a conventional van or enclosed trailer with a width of about 40 inches between the rows $R^1$, $R^2$.

Referring to FIGS. 4 and 9C, 7C, 9D and 9E, a cart positioning/lock system 56 is provided for properly locating and locking the carts 21 in position within the trailer 22. The system 56 includes a plurality of cart brackets 57, fixed to the van side walls 23 at predetermined locations along the length of the trailer 22, which engage corresponding portions of the carts 21 to locate and secure the carts 21 in position. The locations of the brackets 57 correspond preferably with the locations of the ends of the carts 21 when positioned in their rows $R^1$, $R^2$ along the sides 23 and preferably in relation to the location of upright locking post portions 58 projecting from the back corners of each cart 21. Referring also to FIGS. 4 and 5, the locking posts 58 preferably comprise extended sections of the back corner rails 33 which project above the top rails 34, 35 of the carts 21. The upper ends of the locking posts 58 are each fitted with an enlarged end cap 59 having sides 60 thereof projecting laterally outwardly of the posts 58 and fabricated preferably of a tough, low friction, non-marring material such as polypropylene, polyethylene, glass-filled nylon, or the like. The end caps 59 each have a top wall 61 that extends across the top of the post 58 on which it is mounted and each is formed with an opening or socket 62 therein for purposes to be explained hereinafter.

The brackets 57 are fabricated of a strong, rigid material such as aluminum or structural plastic material, and each has a base portion 63 that is secured by rivets R or the like to the side wall 23, 24 of the trailer 22, and preferably to a cargo track 64 that is fixed to the side wall 23, 24 and extends the length of the trailer in position to mount the brackets 57. The base portions 63 of the brackets 57 support cart retaining portions 65 which are configured and positioned to retain the locking posts 58 of the carts 21. The cart-retaining bracket portions 65 preferably have generally an L-shaped configuration, including a top wall portion 66 that extends transversely away from the side wall 23 on which the bracket 57 is mounted in a generally horizontal plane above the level of the top posts 58. They further include a forward retaining wall section 67 that projects downwardly from the top wall portion 66 to a level below the free ends of the locking posts 58, and preferably beyond the end caps 59 as best shown in FIGS. 7C and 9D. The L-shaped configuration of the cart-retaining portions 65 provides a locking channel 68 that is closed at the top and front by the top wall and retaining wall sections 66, 67, open at the bottom, and open at opposite longitudinal ends 69.

As shown best in FIGS. 9C, 7C, 9D and 9E, the locking channels 68 are each dimensioned to receive at least one, and preferably two, locking posts 58 of adjacent carts 21 into the channel 68 from the open ends 69 of the brackets 57. The effective lateral depth dimension is selected such that the forward retaining wall section 67 is positioned outwardly of the side wall 23 a distance sufficient to allow the end caps 59 of the locking posts of the carts 21 to pass behind the wall section 67 when the carts 21 are moved along the side wall 23 of the trailer 22 so as to position the locking posts 58 within the channels 68, but yet be fairly close in proximity to the posts 58 to restrict the lateral inward movement of the carts 21. The structure positively locates and retains the carts 21 against the side walls 23 of the trailer 22. It is preferred that the depth of the channels 68 somewhat exceed the minimum spacing requirements such that a limited amount of play exists between the brackets 57 and the posts 58 to account for tolerances and for ease of moving the posts 58 into and out of the channels 68 (e.g., about ½ inch of play). The length dimension of the brackets 57 is selected to be at least as long as, and preferably greater than, the distance between the locking posts 58 of adjacent carts 21 positioned in their rows $R^1$, $R^2$ in substantially end-to-end abutting relationship, as best shown in FIGS. 7C and 9E, so as to accommodate both of such locking posts 58 within the same locking channel 68. The center-to-center spacing of the brackets 57 thus equals or closely approximates the end-to-end spacing of the carts 21.

Alternative means of securing the mini-pallet containers to the trailer 22 walls are possible as illustrated in FIGS. 9F and 9G where the pin lock consists of a base plate 171 with protruding upper and lower clevis type members 180 each having first apertures 174 and second apertures 177. A U-shaped member 172 having blades 179 on either side of channel 178 is then placed between the clevis members 180 and restrained there by nut 175 and bolt 173. When so restrained by the bolt 173 passing through channel 178 and first apertures 174, the U-shaped member 172 is free to turn from side to side. A mobile beverage cart 21 is then pushed into position against the protruding clevis type members 180 and the U-shaped member 172 pushed against the corner post 27 of the mobile beverage cart until one of the forward plates 179 restrains that post from moving forward. Pin 176 is then placed through second apertures 177 of the clevis type member 180. This prevents the U-shaped member 172 from rotating to free the corner post 27. A similar pin lock 170 is also applied to the opposite rear lower post of the mini-pallet pallet container 21. Once all fourteen mini-pallet containers 21 are in the trailer 22, the fold down floors 25 are lowered forming a false floor. In addition, the fold down floors 25 tend to restrain the lower portions of the mini-pallet containers from rolling away from the trailer walls 56. Alternatively, if fold down flooring 25 is not provided on the mini-pallet containers 21, plastic pallets may be placed in the aisle 158 to accomplish a similar purpose. At the end of the false floor created either by pallets or fold down floor 25, a ramp section 154 is added to permit use of handcart 127b.

Referring now particularly to FIG. 9E, the top wall section 66 of each bracket 57 is formed with an opening 70 that is positioned to align with the socket 62 in the end cap 59 of the aft locking post 58 of each cart 21 (that is, the locking post 58 of each cart nearest the rear end 26 of the trailer 22). A locking pin 71 associated with each bracket 57 is extendable into the aligned openings 70, 62 to lock the carts 21 to the brackets 57 and positively locate and secure the carts 21 longitudinally of the trailer 22. In other words, the carts 22, when locked, are precluded from longitudinal movement in the trailer 22 and are positively located in fixed positions with respect to the other carts 21 within a row and apart from the other row to thereby maintain the width of the aisle 158 within predetermined limits. The opening 70 in each bracket 57 is preferably elongated in the lateral direction as illustrated in FIG. 9E to permit limited lateral movement of the carts 21.

As the first cart 21 is wheeled into the trailer 22, it is moved toward the front 125 and oriented such that its back corner rails 35 are positioned against one of the side walls 23 of the trailer 22. The leading locking post 58 of the cart 21 is guided into the open aft end 69 (i.e., the end nearest the rear 126 of the trailer) of the locking channel 68 of the foremost bracket 57 (i.e., the bracket 57 nearest the front wall 125 of the van trailer 22), while at the same time the locking post 58 on the aft or trailing end of the cart 21 is guided into the locking channel 68 of the next adjacent bracket 57 along the wall. Once the first cart 21 is positioned and the top opening 62 of the aft end cap aligned with the opening 70 of the bracket 57, the foremost locking pin 71 is extended through the openings 62, 70 from above to positively position and lock the cart 21 releasably to the bracket 58 in position against the side wall. It is preferred that each locking pin 71 be tethered to the bracket 57 or side wall 125 of the trailer 22 by a lanyard L. Once the initial cart in each row $R^1$, $R^2$ is locked into position, each subsequent cart 21 can be positioned and retained in a similar manner until the rows $R^1$, $R^2$ are completed.

Referring now to FIG. 11B, it will be seen that the floors 131 of the carts 21 are elevated above the level of the floor 124 of the trailer 22 on which the carts 21 are supported. The leading front edge of each cart floor 131 may be, for example, about 7 ½ inches above the floor 24 of the trailer 22.

According to the invention, it is desirable to be able to unload the mini-pallets 30 of the containers 31 from the carts 21 using a two-wheeled hand truck 127. In effecting this, it is further operatively desirable to support the hand truck 127 at generally the level of the cart floors 31 for engaging, lifting and transporting the mini-stacks 31 with the hand truck 127. According to the invention, a false elevated floor FF is provided in the aisle A between the rows $R^1$, $R^2$ to provide an upper surface that is substantially level with the almost abutting forward edges of the cart floors 131. While various methods of constructing a false floor FF, such as by laying down overturned pallets or multiple false floor sections in the aisle 58 are possible, the safest approach is to integrate such false flooring with the beverage carts 21.

Referring to FIGS. 4, 5B, 5C, 11B, 5I and 5J, each cart 21 is provided with a deck section 72 having a generally rectangular platform configuration of predetermined length between opposite ends 72a, 72b thereof and a predetermined width between opposite front and back edges 72c, 72d thereof. The cart deck sections 72 are mounted by pivots or hinges 72e (FIG. 9D) along their back upper edges 72d to the front ends of the cart base frames 28. Each deck section 72 is pivotal about the axes of the hinges 72e between an upright, stowed or closed position, illustrated in broken chain lines in FIG. 5C, in which the deck section 72 extends along and is generally flush with the front corner rails 32 of the cart 21, and a downwardly pivoted operating position, illustrated in solid lines in FIGS. 4, 5, and 9, in which an upper surface 72f of each deck section 72 is substantially horizontal and level with the forward edge of the cart floor 31 so as to form a horizontal extension of the cart floor 31 forwardly of the cart 21.

Figure 5I:
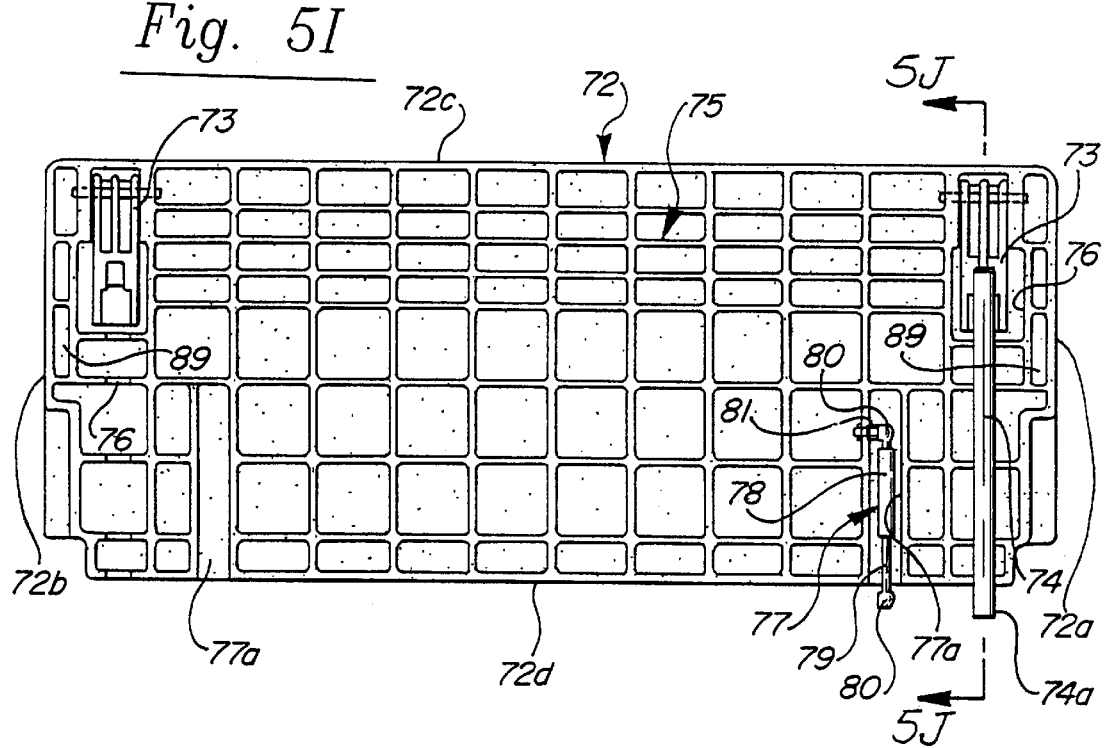
FIG. 5I is a bottom plan view of the deck of the cart of FIG. 5A.
Figure 5J:
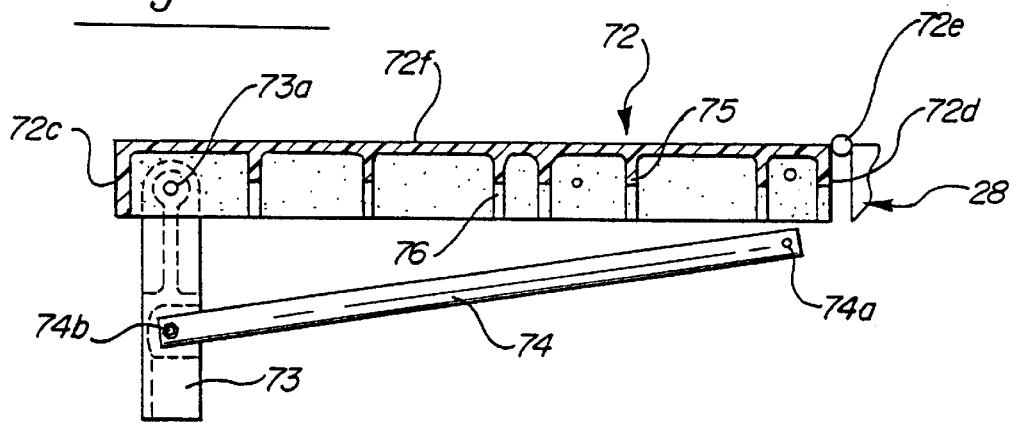
FIG. 5J is an enlarged cross-sectional view taken generally along lines 5J—5J of FIG. 5I.

With particular attention to FIGS. 5C, 5I, and 5J, the deck sections 72 have support legs 73 mounted pivotally at 73a to the underside of the deck sections 72 adjacent the forward free edges 72c of the deck sections 72. The legs 73 may be referenced singly or multiply as leg structure. The legs 73 are coupled adjacent their lower free ends to forwardly extending brackets 28a, fixed to the base frame 28, by linkages, including rigid, non-foldable links 74, pivoted at their respective front and rear ends to the legs 73 and base frame 28 brackets 28a. The links 74 react to and are moveable with the pivoting movement of the deck sections 72 to position the legs 73 between a retracted position folded beneath and into the deck sections 72 when the deck sections are moved to the stowed position (FIG. 5), and an extended floor-engaging vertical position in response to movement of the deck sections 72 to the horizontal use position (FIG. 5C). The links 74 are pivoted at 74a and 74b. It will be seen that the pivots 72e, 74a, 73a, and 74b are arranged in generally parallelogram configuration in FIG. 5C with the pivot or hinge point 72e of the deck to the cart floor being rearward of link pivots 74a.

The deck sections 72 may be fabricated of any of a number of materials such as aluminum decking or various organic polymeric materials, such as polypropylene, polyethylene, an engineered plastic or resin, or glass-filled plastics. The deck sections 72 in the illustrated embodiment are injection molded plastic members, whose upper surface 72f is continuous and preferably molded with traction enhancing features represented by the stippled markings in FIG. 5D. The upper surface 72f is backed by structural ribbing 75, as shown in FIGS. 5I and 5J, to render the deck sections 72 rigid and capable of supporting the composite weight of an operator, hand truck, and a load of stacked containers 31. The underside is preferably formed with recesses 76 of such dimension and location as to accommodate the folding of the legs 73 and the links 74 (FIG. 5I) into nested position within the deck section 72 when the deck section is moved to the stowed vertical position.

The deck sections 72 are spring-controlled in their movement between the stowed and use positions by gas springs 77 which bias the decks 72 over-center as the deck sections 72 move to operating position. The springs 77 positively retain or lock the deck sections 72 in both the stowed and use positions (FIG. 5C). At least one or more, preferably two, gas springs 77 form part of the linkages or linkage assemblies. The gas springs 77 are of the usual type having a gas-filled cylinder 78 and a piston rod 79 which is extendable and retractable relative to the cylinder 78. The gas springs 77 have a socket coupling 80 at each end (FIG. 5I), connected to a laterally extending ball stud 81 provided on each cart on the deck section 72 and on the base frame 28, respectively. The gas springs 77 are of such length and are positioned relative to the hinge axis of each deck section 72 so as to assist an operator in bodily positioning the deck section 72 between the stowed and use positions, while moving over-center of the hinge axis as the deck section 72 moves to its extreme positions to provide spring-biased retention of the deck section 70 in the stowed and use positions. The gas springs 77 in the stowed position are accommodated within recesses 77a formed in the underside of the deck sections 72 (FIG. 5I).

In operation, once the carts 21 are loaded and locked in their rows $R^1$, $R^2$ within the trailer 22, the deck sections 72 are manually pivoted downwardly to their horizontal use positions in which the automatically outwardly pivoted legs 73 engage the floor 124 of the trailer 22. In the stowed position of decks 72, the gas springs maintain a pressure which must be overcome in order to swing the decks 72 out of the locked position. Because of the leverage resulting from manually pushing the front edge of each deck 72 downwardly, and the weight of the deck itself, little force is needed to compress the gas springs 77 sufficiently to initiate and maintain downward pivoting of the deck section and cause links 74 to move legs 73 from nested position to an extended position in which gas springs 77 bias them downwardly.

When the compressing gas springs move past center (i.e. hinge axis 72e) the gas springs exert pressure below the hinge axis 22e so that downward pressure is exerted on the deck 72 and legs 73. This locks or retains the deck in horizontal position. When the deck 72 is to be restored to stowed position, little lifting force is required to extend the gas springs sufficiently to unlock deck 72 and legs 73. As the deck swings up past the hinging axis 72e, the gas springs 77, which were compressed when swung downwardly, assist the upward pivoting movement of deck 72 and the pivoting of legs 73 via links 74 toward nested position. As shown best in FIGS. 4, 11B, and 9C, the predetermined length and width dimensions of the substantially abutting deck sections 72 are so selected as to provide a near-continuous elevated false floor surface along the aisle 158 at the same level as the front edge of the floor 31 of the carts 22, while the deck sections 72 of longitudinally adjacent and laterally opposite carts 22 may be sized to substantially abut one another, it is preferred that some play be provided to account for tolerances and variations in the positioning of the carts by the brackets 57. For example, about a spacing S between the facing sides 72a, 72b and front edges 72c of adjacent deck sections 72 will provide a near-continuous false floor FF while allowing for variations in tolerance and positioning (FIG. 9C).

The van trailer 22 is preferably of the type having a back door or doors 82 (FIG. 13) that open to provide access to the interior of the trailer 22. A conventional powered lift gate 83 provided at the unloading dock is movable between an elevated position (FIG. 13) in which an upper surface 84 of the gate is level with the floor 24 of the trailer 22, and a lowered ground-engaging position facilitating the off-loading of cargo from the trailer 22. It will be seen from FIG. 13 that the false floor FF provided by the deck sections 72 is at a level above the upper surface 84 of the lift gate 83 when the latter is in the elevated position.

According to one aspect of the invention, a ramp, generally designated 85, is positioned between the false floor FF and the lift gate 83 to provide a transition between the floor FF and platform of the lift gate 83. The ramp 85 has a body 86 supported on the floor 24 of the trailer 22 adjacent the exposed side edges 87 of the rearward-most deck sections 70 of the carts 21. A pair of upturned hooks 88 are mounted on a forward end of the ramp body 86 and are extendable beneath the exposed side edges 72b of the rearward-most deck sections 72 where they are received in corresponding recesses or sockets 89 provided on the underside of the deck sections 72 for securing the ramp 85 releasably to the false flooring end sections.

The body 86 of the ramp 85 has a sloped support surface 90 that extends from the false floor FF to the upper surface 84 of the lift gate 83. The support surface 90 is preferably segmented to include a fixed section 91 and a hinged section 92 that is moveable about hinge 92a selectively between an extended use position shown in solid lines in FIG. 18 in which the section 92 extends over and is supported on the surface 84 of the lift gate 83, and a stowed position, shown in broken chain lines, in which the section 91 is folded inwardly of the door 82 of van trailer 22 and its fixed section 92, so as to provide clearance for the closing of the back door(s) 82 of the van or trailer 22.

Upon arrival at a point of delivery, the operator simply wheels the hand truck 127 down the aisle A along the elevated false floor FF and selects the cart or carts 22 and location or locations of the mini-stacks of containers 31 within the cart(s) corresponding to the particular order involved. The hand truck 27 (FIG. 8A), except for the nose plate which will be described hereinafter, is of conventional construction and has an upright handled frame 93 mounting a pair of wheels 94 off the back of the frame 93, and a nose plate 95 off the front of the frame 93. A typical hand truck is disclosed in U.S. Pat. No. 3,997,182.

Referring to FIG. 14, the nose plate 95 illustrated has a generally L-shaped profile with a generally horizontal load-supporting platform 96 and an upright back wall 97 fixed to the frame and supporting the platform 96.

To off-load the appropriate mini-stacks of containers 31, the operator simply extends the platform 96 of the nose plate 95 beneath the mini-pallet 30, which is elevated above the floor 131 of the cart 21 by spaced side feet or rails 98 to provide clearance below the mini pallet 30 for the nose plate 95. Once positioned, the operator rocks the hand truck 127 rearwardly to transfer the palleted containers 31 onto the hand truck 127.

The mini-pallets involved with the present system has, in addition to side feet 98, a downwardly projecting central disc or piloting pad 99 that is generally cylindrical in configuration and engages the floor 31 of the cart 21. The pad 99 is spaced inwardly from the front edge of the mini-pallet 30. One preferred embodiment of the mini-pallets 30 according to the present invention, designed by Rehrig Pacific Company, Inc., is illustrated in FIGS. 6A–D. The primary functional aspects of the mini-pallets 30 include an upper open work planar surface 133 approximately 11"×17" in size. This size will accommodate a case of 12 ounce canned beverages and other equivalent SKU package sizes. The mini-pallet 30 should not have a raised flange at the edges as the various SKUs have differing dimensions. Furthermore, mini-pallets 30 have a central support 34, or piloting pad 99 (FIG. 6B), which is preferably circular in shape. At the longitudinal edges of mini-pallets 30 are supporting legs 99 which together with the center support 134 provide approximately ¾" clearance for the planar open work surface 133. The planar surface 133 preferably contains many openings not only to reduce the amount of material used in manufacture, but also to permit easy drainage for any inadvertent beverage leakage. Bevels at the ends of supporting legs 99 are preferably approximately 45°. The diameter of the center support 134 is preferably about 3".

The mini-pallets 30 are adapted to be utilized in connection with specially configured hand-trucks. A suitable hand-truck is the narrow aisle configuration of hand-truck model number B16-D-1040-C45-62 available from MagLine, Inc. The wing or tongue 96 of hand truck 127 shown in FIGS. 8A and 8B is specifically adapted to include a recess 100 sized only slightly larger than the center support 99 of mini-pallet 30. The tongue 96 may be inserted in the approximate ¾" clearance space 131 beneath a loaded mini-pallet 30. In this fashion hand truck 127 may be used to easily lift the mini-pallet and any stack of soft drinks 31 on the pallet 30.

The mating of the tongue recess 100 of hand truck 127 and the central support member 99 of the mini-pallet assists in the positioning of the hand truck tongue 96 centrally beneath the mini-pallet 30. When stacked, the central support 99 and edge supports 98 of a top mini-pallet 30 fit into corresponding indentations 129, 128 as shown in FIG. 8B, of a bottom mini-pallet.

To accommodate disc 99, platform 96 is provided with a recess or cut-out 100 that extends from a forward edge 101 of the platform 96 inwardly toward the back wall 97 and terminates short of the back wall 97. The curvilinear base 102 of the cut-out 100 conforms in size, shape and location to the circular pad or disc 99 on the mini-pallet 30. Such a nose plate 95 enables the mini-pallets 30 to be fully received and supported on the platform 96 with the pad 99 accommodated within the cutout 100.

It is preferred also that the cut-out 100 have side walls 103 that converge from the forward edge 101 to the base 102 for piloting the pad 99 into the cut-out 100. A taper of about 5 degrees is preferable. The cut out 100 gives the platform 96 a generally U-shaped configuration, when viewed in plan as in FIG. 8B, which has side portions 104 on either side of the cut-out 100 joined by a flat connecting or bridging plate portion 105 extending behind the cut-out 100 continuously between the side portions 104. The provision of the continuous connecting or bridging plate portion 105 provides the platform 95 with strength and rigidity to prevent it, and particularly the side portions 104, from flexing under load.

As shown in FIG. 12, alternatively, the side and back walls 136 and 137 are modified to provide viewing slots 106 which are provided in two vertical rows 107 and 108 extending along the side edges of the side and back walls 136 and 137, respectively. The through slots 106 are diagonally disposed to enhance their viewing function.

Once the palleted containers 31 are loaded onto the platform 96 of the hand truck 27, the operator simply wheels the hand truck 27 along the elevated false floor FF toward the open back 26 of the trailer 22, down the ramp 85, and onto the elevated lift gate 83, whereupon the gate 83 is lowered to the ground to permit the containers 31 to be wheeled into the facility of the retailer or other receiving party. The process is repeated until the delivery of the order is completed, after which the hand truck 27 is loaded onto the vehicle, the ramp 85 folded to the stowed position, the door(s) of the trailer 22 closed, and the trailer transported to the next delivery site.

Once the trailer 22 has been emptied of product, it is returned to the distribution center where the ramp 85 is detached and removed, the deck sections 70 raised to their stowed positions, and the carts 22 unlocked and removed from the trailer 22 in reverse order for restocking with new product.

If a combination route is being assembled with both bulk and route accounts, the last two mini-pallet containers 21 on either side of the aisle 158 may be rolled in the aisle 158 toward the front of the trailer 22 and secured using an aisle canvas door 122a. This will permit the loading of four bulk pallets 159 in the rear of trailer 22 as illustrated in FIG. 9A. As previously mentioned, the use of aisle pallet doors will also permit the loading of separate mini-pallet 30 and product 31 stacks in the aisle 158 as shown in FIGS. 11A and 10A.

If a combination route is assembled, bulk pallets 159 must be delivered first. Once that delivery has taken place, the mini-pallet containers 21 in the aisle 58 may be relocated to the sidewalls of the trailer 22 and the route may continue.

Once at an account on his route, the driver will unfold the lift gate 152 and open the rear door 155. The driver may then lower and ride up the lift gate 152 to a position level with the trailer floor and locate the product stacks 31 and the mini-pallet container 21 which correspond to the stock. The stop number is preferably located on each pallet ticket and attached to an easily visible clip bar 26 or placed in a clear plastic pocket 149 on the front of the canvas door 122 within each bay or mini-pallet or on each mini-pallet container 21. The driver then releases the straps 23 on the canvas door 122 and opens the door to the mini-pallet container 21 exposing the product stacks for that account. The product stacks 31 are then removed using the two-wheel hand truck 127 which is designed to interface with the mini-pallet 30 at the bottom of each stack of product 31. Hand trucks 127 preferably have wheels spaced only about 18" or less apart to permit sufficient maneuverability within the trailer 22.

The entire order, which may include multiple mini-pallet stacks 31, is placed on the lift gate 152 and lowered to ground level for delivery. Once the delivery is completed, the driver then returns to the vehicle with any returned product, shells, or empty mini-pallets 30 and places them into an empty mini-pallet container 21 and secures the load with the canvas door 122 and straps 123. The driver then proceeds to the next account. When the route is complete the vehicle returns to the beverage warehouse 10 and is checked in at the gate or dock. Prior to loading for the next route, the vehicle is backed into the dock to be stripped. If plastic pallets are utilized in the aisle to form a false floor, they are removed or alternatively folding floor sections 25 are folded up, and each mini-pallet container 21 is released from the wall and rolled off the trailer 22 by an order filler 19. The canvas doors 122 to the mini-pallet containers 21 are opened and wrapped around to the back or side of the containers 21 and attached. Then the mini-pallet containers 21 are ready for the order filler 19 to pull around the warehouse 10, possibly using a man ride tugger vehicle, to return any shells or returned product to the appropriate location within the warehouse, and commence the order filling process previously described.

It will be appreciated that this delivery system provides increased productivity and maximizes case delivery per hour on delivery routes, in large part by reduction of frequency of handling product. In addition, this results in improved customer service levels, reduced instances of misloaded products, provides more time for delivery personnel to attend to product presentation in the customer outlet, and permits a driver to more accurately meet customer delivery window times. The mini-pallets 30 according the present invention will reduce product damage both during handling with hand trucks 127, and when utilized as a base for in-store product displays by retailers.

The mini-pallet system also facilitates the accommodation of many SKU's in a single trailer 22 by moving the order building process to the relatively spacious and well-stocked warehouse facilities instead of the bays of a side delivery trailer. The loading and delivery process provides an ergonomically friendly work environment, with reduced lifting and twisting for delivery drivers, and no necessity to dig product out of side load truck product bins. This should result in extended work force tenure through both improved employee morale, and reduced workplace injuries. Furthermore, the improved route truck trailer 22 permits unparalleled delivery flexibility in that the same trailers can be used to deliver both bulk and route accounts on the same route, or be used completely for route accounts, or the trailer can be converted to complete bulk account usage by removing the mini-pallet containers.

An alternative mini-pallet container 121 depicted in FIG. 12, may be utilized to avoid the maintenance issues associated with casters 21 on mini-pallet containers 21. Such a mini-pallet container 121 would require a fork lift 19, utilizing a custom clip attachment, to load and unload mini-pallet containers 121 from the truck trailer 22. These mini-pallet containers 121 could be placed on a man ride pallet jack (not shown) to be traveled around the warehouse 10 by the order filler 19. In all other material respects the use of the mini-pallet container 121 in FIG. 10 is similar to the mini-pallet container 21 depicted in FIGS. 3A through 3D. It will be noted that unless the mini-pallet containers have casters 21, it will not be possible to place a bulk load 59 at the end of the trailer 22 and maintain the extra mini-pallet containers 21 in the aisle of the trailer 50. However, a combination trailer can still be loaded simply by utilizing only 10 or 12 mini-pallet containers 121 as shown in FIG. 9, where ten mini-pallet containers 121 are in place together with four bulk pallets 159 for loading dock delivery.

An alternative trailer configuration is shown if FIG. 10. In this construction, a trailer is provided with fourteen aluminum or plastic folding bay walls 155, with canvas door and locking pins, shown in greater detail in FIG. 7B. In this fashion, the folding bay walls 155 act to help secure mini-pallet stacks 31 or mobile beverage carts 21 in their position in the trailer 22. When desired, the folding walls 155 can be collapsed flush against the trailer wall 156 to permit the trailer to be utilized partially or completely for bulk purposes.

It will be understood that yet another variation of the use of account loaded mini-pallets 30 may be undertaken without the use of mini-pallet containers 21, 121. In this scenario, the product stacks 31 are built to account orders on mini-pallets 30 within the warehouse and then loaded by hand truck 127 into appropriate bays 157 on the trailer 22. FIG. 10A shows the use of mini-pallets 30 without any mini-pallet containers 21, 121. In this setting, it is unnecessary to have flooring such as provided by fold down floors 25 to raise the height of the hand truck 127 to the level of the mini-pallets 30 within mini-pallet containers 21, 121.

In the alternative design of FIG. 8A, the folding curtains 122 are not found on mini-pallet containers 21, 121, but are instead located at the front of each bay 57. Once the trailer 22 is loaded, the canvas doors 122 are unfolded and attached to retain the product. During the delivery process, the driver/delivery person proceeds through the same steps except the product stacks 31 or mini-pallets 30 are simply unloaded from bays 157 rather than mini-pallet containers 21, 121.

While the preferred embodiments of the invention have been described above in detail, it is to be understood that variation and modifications can be made therein without departing from the spirit and scope of the present invention as set forth in the following claims. For example, the invention can be used with various beverage transport bodies such as trucks or trailers. The vehicle can have somewhat different dimensions and a different number of bays or mini-pallet containers than described above. It is the aim of the appended claims to cover all changes and modifications that may be made without departing from the spirit and scope of the invention.

What is claimed is:

1. In combination with a transport cart, supported for travel into a van body having a floor, to join like carts positioned in fore to aft extending laterally spaced rows leaving an aisle between them in the van body, the cart having a bottom support on which at least one product configuration is supported on a pallet at a level above said van floor and having an open front side to permit the unloading of said pallet and product from said bottom support; the improvement comprising:

a. a disc dependent from said pallet; and b. a hand truck having a partially bifurcated nose plate defining disc-embracing forwardly projecting arms for engaging under said pallet and enabling the removal of said pallet and product from the cart.

2. The combination of claim 1 wherein said nose plate has front and rear edges and said arms terminate at a spaced distance forwardly from said rear edge of said nose plate to leave a plate surface between the arms and rear edge of the nose plate.

3. The combination of claim 2 wherein said disc is supported by the van floor, is circular, and is substantially laterally centrally positioned on said pallet, and said arms are joined by a plate surface portion conforming to the curvature of said disc.

4. The combination of claim 1 wherein said bottom support on said cart comprises a cart bottom with a front and rear edge which tilts downwardly from its front edge to its rear edge.

5. The combination of claim 1 wherein the hand truck is supported by a pair of wheels.

6. The combination of claim 1 wherein the carts further comprise side closures, a rear side, and an open front side facing laterally toward a like cart in an opposite row.

7. The combination of claim 6 wherein the carts have a clipboard secured to the rear walls.

8. The combination of claim 6 wherein the carts have a lock member for cooperating with a track on an interior wall portion of the van body.

9. The combination of claim 6 wherein the carts have a tarp disengagably secured over the open front side.

10. The combination of claim 1 wherein the carts are supported by rollers on the van floor.

11. The combination of claim 1 wherein the van body is equipped with tracks which receive a locking member connected to the carts thereby securing the carts relative to the van body.

12. The combination of claim 1 further comprising a tarp connected to the cart wherein at least a portion of the tarp is disengagable from the cart to provide access within the cart.

13. The combination of claim 12 wherein the tarp further comprises at least one see-through panel.

14. The combination of claim 1 further comprising a deck moveable from a stowed retracted position to an extended generally horizontal aisleway-forming operative position in which laterally aligned opposed like carts in the rows can form a false floor aisleway at substantially the level of said cart bottom supports.

15. The combination of claim 14 further comprising a ramp at a last pair of opposed like carts.

16. The combination of claim 1 wherein the van body is a trailer.

\* \* \* \* \*